(12) United States Patent
Marappan et al.

(10) Patent No.: US 12,131,047 B2
(45) Date of Patent: Oct. 29, 2024

(54) NON-DISRUPTIVE MIGRATION OF LOGICAL STORAGE DEVICES IN A LINUX NATIVE MULTI-PATHING ENVIRONMENT

(71) Applicant: Dell Products L.P., Round Rock, TX (US)

(72) Inventors: Gopinath Marappan, Coimbatore (IN); Madhu Tarikere, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 664 days.

(21) Appl. No.: 17/501,433

(22) Filed: Oct. 14, 2021

(65) Prior Publication Data

US 2023/0126349 A1 Apr. 27, 2023

(51) Int. Cl.
G06F 3/06 (2006.01)
(52) U.S. Cl.
CPC ............ *G06F 3/0647* (2013.01); *G06F 3/061* (2013.01); *G06F 3/067* (2013.01)
(58) Field of Classification Search
None
See application file for complete search history.

(56) References Cited

U.S. PATENT DOCUMENTS

| | | | |
|---|---|---|---|
| 5,838,580 A * | 11/1998 | Srivatsa | G06F 30/3308 716/134 |
| 6,567,397 B1 | 5/2003 | Campana et al. | |
| 6,687,746 B1 | 2/2004 | Shuster et al. | |
| 6,697,875 B1 | 2/2004 | Wilson | |

(Continued)

FOREIGN PATENT DOCUMENTS

| | | |
|---|---|---|
| CN | 103677927 B | 2/2017 |
| EP | 1117028 A2 | 7/2001 |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Craig C Dorais
(74) *Attorney, Agent, or Firm* — Ryan, Mason & Lewis, LLP

(57) ABSTRACT

A first logical storage device associated with a first multi-path device is migrated to a second logical storage device associated with a second multi-path device. The migrating illustratively comprises suspending the first multi-path device, creating a proxy device for the first multi-path device, implementing a mirror device to provide a mirroring arrangement between the proxy device and the second multi-path device, inserting a request splitter between the first multi-path device and the mirror device, redirecting output of the first multi-path device to the request splitter, and resuming the first multi-path device. Responsive to synchronization of the proxy device and the second multi-path device via the mirroring arrangement, the migrating further comprises suspending the first multi-path device, removing the request splitter, the mirror device and the proxy device, redirecting output of the first multi-path device to the second logical storage device, and resuming the first multi-path device.

20 Claims, 14 Drawing Sheets

(56) References Cited

U.S. PATENT DOCUMENTS

| | | |
|---|---|---|
| 7,003,527 B1 | 2/2006 | Lavallee et al. |
| 7,275,103 B1 | 9/2007 | Thrasher et al. |
| 7,397,788 B2 | 7/2008 | Mies et al. |
| 7,454,437 B1 | 11/2008 | Lavallee et al. |
| 7,617,292 B2 | 11/2009 | Moore et al. |
| 7,668,981 B1 | 2/2010 | Nagineni et al. |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,819,307 B1 | 8/2014 | Raizen et al. |
| 8,825,919 B1 | 9/2014 | Lim et al. |
| 8,832,334 B2 | 9/2014 | Okita |
| 8,874,746 B1 | 10/2014 | Gonzalez |
| 8,959,249 B1 | 2/2015 | Love |
| 9,026,694 B1 | 5/2015 | Davidson et al. |
| 9,201,803 B1 | 12/2015 | Derbeko et al. |
| 9,400,611 B1 | 7/2016 | Raizen |
| 9,430,368 B1 | 8/2016 | Derbeko et al. |
| 9,594,780 B1 | 3/2017 | Esposito et al. |
| 9,647,933 B1 | 5/2017 | Tawri et al. |
| 9,672,160 B1 | 6/2017 | Derbeko et al. |
| 9,712,613 B2 | 7/2017 | Balasubramanian et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,369 B1 | 12/2019 | Mallick et al. |
| 10,523,513 B2 | 12/2019 | Bennett et al. |
| 10,606,496 B1 | 3/2020 | Mallick et al. |
| 10,637,917 B2 | 4/2020 | Mallick et al. |
| 10,652,206 B1 | 5/2020 | Pusalkar et al. |
| 10,754,572 B2 | 8/2020 | Kumar et al. |
| 10,757,189 B2 | 8/2020 | Mallick et al. |
| 10,764,371 B2 | 9/2020 | Rao et al. |
| 10,789,006 B1 | 9/2020 | Gokam et al. |
| 10,817,181 B2 | 10/2020 | Mallick et al. |
| 10,838,648 B2 | 11/2020 | Sharma et al. |
| 10,880,217 B2 | 12/2020 | Mallick et al. |
| 10,884,935 B1 | 1/2021 | Doddaiah |
| 10,911,402 B2 | 2/2021 | Pusalkar et al. |
| 11,050,660 B2 | 6/2021 | Rao et al. |
| 11,093,155 B2 | 8/2021 | Anchi et al. |
| 11,106,381 B2 | 8/2021 | Rao et al. |
| 2001/0054093 A1 | 12/2001 | Iwatani |
| 2002/0023151 A1 | 2/2002 | Iwatani |
| 2002/0103923 A1 | 8/2002 | Cherian et al. |
| 2003/0179227 A1 | 9/2003 | Ahmad et al. |
| 2003/0195956 A1 | 10/2003 | Bramhall et al. |
| 2003/0208581 A1 | 11/2003 | Behren et al. |
| 2004/0010563 A1 | 1/2004 | Forte et al. |
| 2004/0057389 A1 | 3/2004 | Klotz et al. |
| 2004/0073648 A1 | 4/2004 | Tanino et al. |
| 2004/0081186 A1 | 4/2004 | Warren et al. |
| 2006/0026346 A1 | 2/2006 | Kadoiri et al. |
| 2006/0036736 A1 | 2/2006 | Kitamura et al. |
| 2006/0106819 A1 | 5/2006 | Dhanadevan et al. |
| 2006/0129763 A1 | 6/2006 | Uemura |
| 2006/0277383 A1 | 12/2006 | Hayden et al. |
| 2007/0174849 A1 | 7/2007 | Cheung et al. |
| 2007/0239989 A1 | 10/2007 | Barnett et al. |
| 2007/0242617 A1 | 10/2007 | Ichimura |
| 2007/0294563 A1 | 12/2007 | Bose |
| 2008/0043973 A1 | 2/2008 | Lai et al. |
| 2008/0147893 A1 | 6/2008 | Marripudi et al. |
| 2008/0201458 A1 | 8/2008 | Salli |
| 2008/0244174 A1 | 10/2008 | Abouelwafa et al. |
| 2008/0301332 A1 | 12/2008 | Butler et al. |
| 2009/0006780 A1 | 1/2009 | Sato et al. |
| 2009/0259749 A1 | 10/2009 | Barrett et al. |
| 2009/0282135 A1 | 11/2009 | Ravindran et al. |
| 2010/0131950 A1 | 5/2010 | Yamada et al. |
| 2010/0313063 A1 | 12/2010 | Venkataraja et al. |
| 2011/0161520 A1 | 6/2011 | Horiuchi et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2012/0163374 A1 | 6/2012 | Shah et al. |
| 2012/0246345 A1 | 9/2012 | Contreras et al. |
| 2013/0019001 A1 | 1/2013 | Winokur |
| 2013/0046892 A1 | 2/2013 | Otani |
| 2013/0117766 A1 | 5/2013 | Bax et al. |
| 2013/0121161 A1 | 5/2013 | Szabo et al. |
| 2013/0339551 A1 | 12/2013 | Flanagan et al. |
| 2014/0105068 A1 | 4/2014 | Xu |
| 2015/0089015 A1 | 3/2015 | Rosset et al. |
| 2015/0222705 A1 | 8/2015 | Stephens |
| 2015/0242134 A1 | 8/2015 | Takada et al. |
| 2015/0319245 A1 | 11/2015 | Nishihara et al. |
| 2016/0050277 A1 | 2/2016 | Kirk et al. |
| 2016/0092136 A1 | 3/2016 | Balakrishnan et al. |
| 2016/0117113 A1 | 4/2016 | Li et al. |
| 2016/0246749 A1 | 8/2016 | Kobashi |
| 2016/0335003 A1 | 11/2016 | Ahmed et al. |
| 2016/0380804 A1 | 12/2016 | Amano |
| 2017/0134220 A1 | 5/2017 | Chen et al. |
| 2017/0220406 A1 | 8/2017 | Parnell et al. |
| 2017/0235507 A1 | 8/2017 | Sinha et al. |
| 2018/0004425 A1 | 1/2018 | Suzuki |
| 2018/0026863 A1 | 1/2018 | Hughes et al. |
| 2018/0189635 A1 | 7/2018 | Olarig et al. |
| 2018/0253256 A1 | 9/2018 | Bharadwaj |
| 2018/0317101 A1 | 11/2018 | Koue |
| 2019/0020603 A1 | 1/2019 | Subramani et al. |
| 2019/0095299 A1 | 3/2019 | Liu et al. |
| 2019/0108888 A1 | 4/2019 | Sarkar et al. |
| 2019/0319846 A1 | 10/2019 | Dhanadevan et al. |
| 2019/0334987 A1 | 10/2019 | Mallick et al. |
| 2020/0021653 A1 | 1/2020 | Rao et al. |
| 2020/0021654 A1 | 1/2020 | Rao et al. |
| 2020/0097203 A1 | 3/2020 | Mallick et al. |
| 2020/0106698 A1 | 4/2020 | Rao et al. |
| 2020/0110552 A1 | 4/2020 | Kumar et al. |
| 2020/0112608 A1 | 4/2020 | Patel et al. |
| 2020/0192588 A1 | 6/2020 | Kumar et al. |
| 2020/0204475 A1 | 6/2020 | Mallick et al. |
| 2020/0204495 A1 | 6/2020 | Mallick et al. |
| 2020/0213274 A1 | 7/2020 | Pusalkar et al. |
| 2020/0241890 A1 | 7/2020 | Mallick et al. |
| 2020/0314218 A1 | 10/2020 | Kumar et al. |
| 2020/0348860 A1 | 11/2020 | Mallick et al. |
| 2020/0348861 A1 | 11/2020 | Marappan et al. |
| 2020/0348869 A1 | 11/2020 | Gokam |
| 2020/0349094 A1 | 11/2020 | Smith et al. |
| 2020/0363985 A1 | 11/2020 | Gokam et al. |
| 2020/0372401 A1 | 11/2020 | Mallick et al. |
| 2020/0401546 A1* | 12/2020 | Mehta .................. G06F 13/124 |
| 2021/0019054 A1 | 1/2021 | Anchi et al. |
| 2021/0026551 A1 | 1/2021 | Tidke et al. |
| 2021/0026650 A1 | 1/2021 | Rao et al. |
| 2021/0157502 A1 | 5/2021 | Rao et al. |
| 2021/0181965 A1 | 6/2021 | Anchi et al. |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |
| WO | PCT/US2019/067144 | 5/2020 |

OTHER PUBLICATIONS

NVM Express, "NVM Express, Revision 1.3," NVM Express, May 1, 2017, 282 pages.

VMWARE, "Multipathing Configuration for Software iSCSI Using Port Binding," Technical White Paper, Apr. 25, 2012, 15 pages.

(56) References Cited

OTHER PUBLICATIONS

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMware, Inc. "VMware VMFS Volume Management," 2009, 8 pages.

Dell EMC, "Dell EMC Unity: Virtualization Integration," Technical White Paper, Oct. 2019, 39 pages.

Dell EMC, "Dell EMC PowerMax: ISCSI Implementation for Dell EMC Storage Arrays Running PowerMaxOS," Technical White Paper, Sep. 2019, 35 pages.

Wikipedia, "Fibre Channel Zoning," https://en.wikipedia.org/wiki/Fibre_Channel_zoning, Aug. 19, 2020, 2 pages.

E. Smith, "Introducing Target Driven Zoning (TDZ)" https://brasstacksblog.typepad.com/brass-tacks/2012/01/introducing-target-driven-zoning-tdz.html, Jan. 16, 2012, 9 pages.

Broadcom, "Fabric Operating System 9.0," Technical Brief, Fabric Notifications, FOS-90-Fabric-Notifications-OT101, Nov. 4, 2020, 12 pages.

Brocade, "Brocade Guide to Undertanding Zoning," vol. 1, 2002, 27 pages.

A. Wasson, "General Rules and Limits for Auto-Provisioning on Symmetric VMAX," http://community.emc.com/docs/DOC-16553, May 8, 2012, 2 pages.

U.S. Appl. No. 17/151,302 filed in the name of Vinay G. Rao et al. filed Jan. 18, 2021, and entitled "Multi-Path Layer Configured for Detection and Mitigation of Slow Drain Issues in a Storage Area Network.".

E. Goggin et al., "Linux Multipathing," Proceedings of the Linux Symposium, vol. 1, 2005, 21 pages.

K. Ueda et al., "Request-based Device-mapper Multipath and Dynamic Load Balancing," Proceedings of the Linux Symposium, vol. 2, 2007, 9 pages.

* cited by examiner

NON-DISRUPTIVE MIGRATION OF LOGICAL STORAGE DEVICES IN A LINUX NATIVE MULTI-PATHING ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations for delivery to storage ports of the storage system. Various types of storage access protocols can be used by host devices to access logical units (LUNs) or other logical storage devices of the storage system, including by way of example Small Computer System Interface (SCSI) access protocols and Non-Volatile Memory Express (NVMe) access protocols. Different ones of the host devices can run different applications with varying workloads and associated IO patterns. Such host devices also generate additional IO operations in performing various data services such as migration. However, migration of logical storage devices within a given storage system or from one storage system to another storage system using conventional approaches can be problematic. For example, it can be difficult to implement non-disruptive migration of logical storage devices in a Linux native multi-pathing environment. Accordingly, a need exists for improved migration techniques that can avoid such drawbacks of conventional approaches, particularly in the context of Linux native multi-pathing.

SUMMARY

Illustrative embodiments provide improved techniques for non-disruptive migration of data from one logical storage device to another logical storage device. The two logical storage devices, which may be respective LUNs or other types of logical storage volumes, are also illustratively referred to as respective "source" and "target" logical storage devices of the migration process, and such devices can be in the same storage system or in separate storage systems. In the latter case, the two separate storage systems may be referred to herein as source and target storage systems. Such storage systems illustratively comprise respective storage arrays. Logical storage devices subject to a migration process as disclosed herein are also referred to herein as "logical devices" or simply "devices."

In some embodiments, the disclosed non-disruptive migration techniques are implemented at least in part in a multi-path layer of at least one host device configured to communicate over a storage area network (SAN) with one or more storage arrays or other types of storage systems. One or more such embodiments provide highly efficient non-disruptive migration of logical storage devices in a Linux native multi-pathing environment, although the disclosed techniques can be utilized in other environments.

The multi-path layer illustratively comprises at least one multi-path input-output (MPIO) driver configured to process IO operations of at least one host device that communicates with one or more storage arrays or other types of storage systems over designated paths through a SAN or other type of network.

Other types of host drivers or other host device components can be used in place of or in addition to one or more MPIO drivers in implementing functionality for non-disruptive migration of logical storage devices as disclosed herein.

In one embodiment, an apparatus comprises at least one processing device that includes a processor and a memory, with the processor being coupled to the memory. The at least one processing device is configured to control delivery of IO operations from a host device to a storage system over selected ones of a plurality of paths through a network, and to migrate a first logical storage device associated with a first multi-path device to a second logical storage device associated with a second multi-path device.

Migrating the first logical storage device to the second logical storage device illustratively comprises suspending the first multi-path device, creating a proxy device for the first multi-path device, implementing a mirror device to provide a mirroring arrangement between the proxy device and the second multi-path device, inserting a request splitter between the first multi-path device and the mirror device, redirecting output of the first multi-path device to the request splitter, and resuming the first multi-path device.

Responsive to synchronization of the proxy device and the second multi-path device via the mirroring arrangement between the proxy device and the second multi-path device, the migrating of the first logical storage device to the second logical storage device illustratively further comprises suspending the first multi-path device, removing the request splitter, the mirror device and the proxy device, redirecting output of the first multi-path device to the second logical storage device, and resuming the first multi-path device.

The at least one processing device illustratively comprises at least a portion of the host device. Other embodiments can include multiple host devices, with each such host device implementing similar functionality.

In some embodiments, the at least one processing device comprises at least one MPIO driver implemented in the host device and configured to control delivery of IO operations to storage devices of the storage system over selected ones of the plurality of paths through the network. For example, the MPIO driver is illustratively configured to perform at least a portion of the migrating of the first logical storage device to the second logical storage device, and possibly additional or alternative functionality.

The MPIO driver of the host device in some embodiments comprises a device mapper MPIO driver operating in a Linux native multi-pathing environment.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
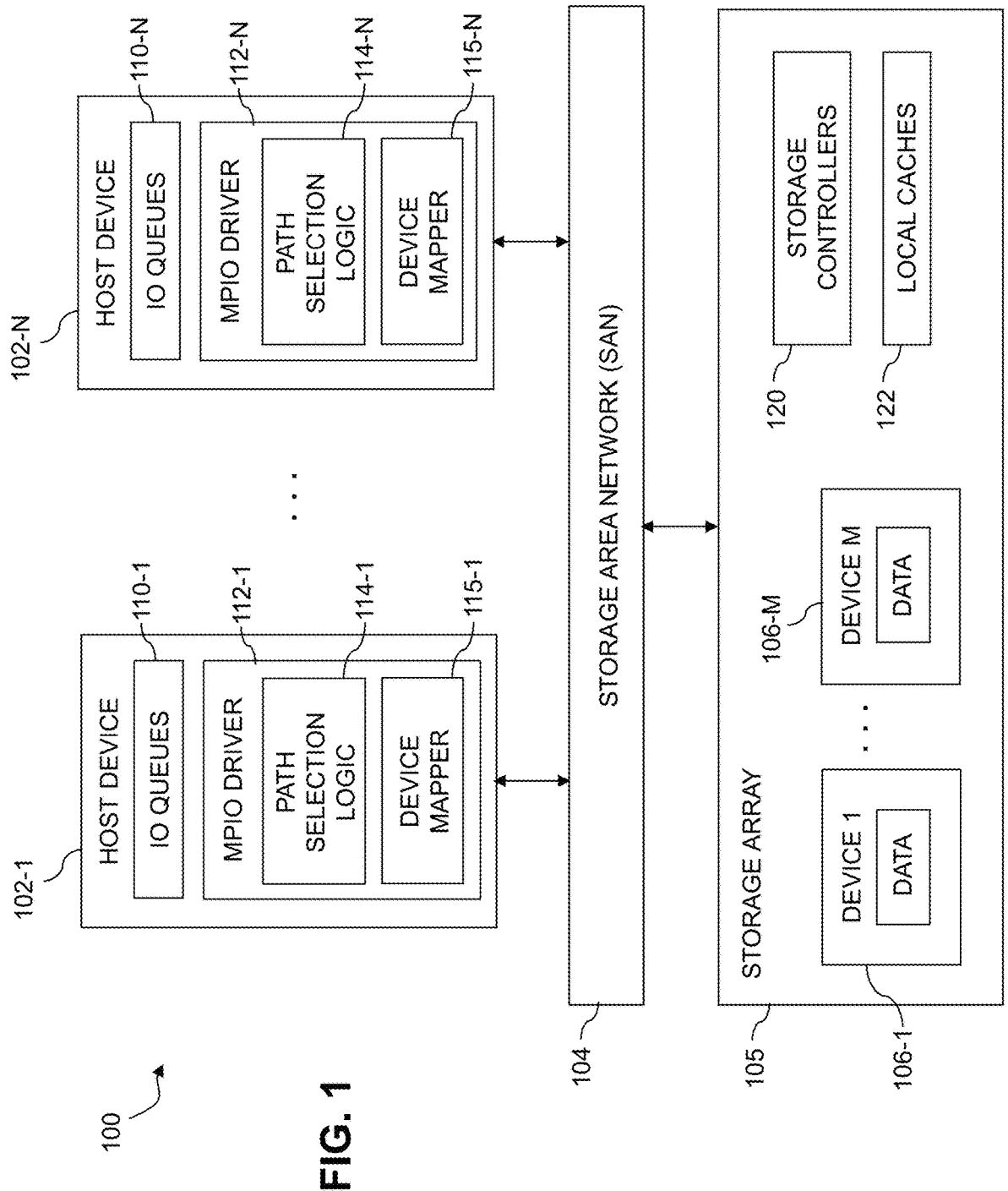
FIG. 1 is a block diagram of an information processing system configured with functionality for non-disruptive migration of logical storage devices in an illustrative embodiment.

FIG. 1 shows an information processing system 100 configured in accordance with an illustrative embodiment. The information processing system 100 comprises a plurality of host devices 102-1, . . . 102-N. The host devices 102 communicate over a storage area network (SAN) 104 with at least one storage array 105. The SAN 104 in some embodiments illustratively comprises one or more switch fabrics. The storage array 105 comprises a plurality of storage devices 106-1, . . . 106-M each storing data utilized by one or more applications running on one or more of the host devices 102. The storage devices 106 are illustratively arranged in one or more storage pools.

The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 over the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands of a SCSI access protocol and/or Non-Volatile Memory Express (NVMe) commands of an NVMe access protocol, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand (IB), Gigabit Ethernet or Fibre Channel (FC). Numerous alternative networking arrangements are possible in a given embodiment, as will be appreciated by those skilled in the art.

The host devices 102 comprise respective sets of IO queues 110-1, . . . 110-N and respective MPIO drivers 112-1, . . . 112-N. The MPIO drivers 112 collectively comprise a multi-path layer of the host devices 102. Path selection functionality for delivery of IO operations from the host devices 102 to the storage array 105 is provided in the multi-path layer by respective instances of path selection logic 114-1, . . . 114-N implemented within the MPIO drivers 112. The multi-path layer further provides functionality for non-disruptive migration of logical storage devices as disclosed herein. Such functionality is provided at least in part using respective instances of device mapper 115-1, . . . 115-N implemented within the MPIO drivers 112.

The MPIO drivers 112 may comprise, for example, otherwise conventional MPIO drivers, such as Linux native multi-path drivers, suitably modified in the manner disclosed herein to provide functionality for non-disruptive migration of logical storage devices. Other types of MPIO drivers may be suitably modified to incorporate functionality for non-disruptive migration of logical storage devices as disclosed herein.

The host devices 102 can include additional or alternative components. For example, in some embodiments, the host devices 102 comprise respective local caches, implemented using respective memories of those host devices. Other examples of memories of the respective host devices 102 that may be utilized to provide local caches include one or more memory cards or other memory devices, such as, for example, an NVMe over PCIe cache card, a local flash drive or other type of NVM storage drive, or combinations of these and other host memory devices.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

A given IO operation is therefore illustratively generated by a process of an application running on the host device 102-1, and is queued in a given one of the IO queues 110-1 of the host device 102-1 with other operations generated by other processes of that application, and possibly other processes of other applications.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value. A negotiated link speed is an example of what is more generally referred to herein as a "negotiated rate."

The negotiated rates of the respective initiator and target of a particular one of the paths illustratively comprise respective negotiated data rates determined by execution of at least one link negotiation protocol for that path. The link negotiation protocol is illustratively performed separately by the initiator and the target, and involves each such component separately interacting with at least one switch of a switch fabric of the network 104 in order to determine the negotiated rate, potentially leading to substantial mismatches in initiator and target negotiated rates for the same switch, set of switches or switch fabric of the SAN 104.

The term "negotiated rate" therefore illustratively comprises a rate negotiated between an initiator or a target and a switch of a switch fabric of network 104. However, the term "negotiated rate" as used herein is intended to be broadly construed so as to also encompass, for example, arrangements that refer to negotiated speeds. Any of a wide variety of different link negotiation protocols can be used, including auto-negotiation protocols, as will be readily appreciated by those skilled in the art.

For example, some embodiments are configured to utilize link negotiation protocols that allow negotiation of data rates, such as 1G, 2G, 4G, 8G, 16G, 32G, 64G and 128G, where G denotes Gigabits per second (Gb/sec). The link bandwidth is illustratively specified in terms of Megabytes per second (MB/sec), and the actual amount of data that can be sent over the link in practice is typically somewhat lower than the negotiated data rate. Accordingly, a negotiated rate of 1G in some systems may correspond to an actual achievable data rate that is lower than 100 MB/see, such as a rate of 85 MB/sec. Other negotiated rates referred to herein are denoted in terms of Gigabytes per second (GB/sec).

The term "negotiated rate" as used herein is therefore intended to be broadly construed, so as to encompass, for example, a theoretical negotiated rate or an actual achievable data rate that corresponds to the theoretical negotiated rate within a given system.

It is also to be appreciated that a wide variety of other types of rate negotiation may be performed in other embodiments.

In some embodiments, the system 100 is configured in accordance with a layered system architecture that illustratively includes a host device processor layer, an MPIO layer, an HBA layer, a switch fabric layer, a storage array port layer and a storage array processor layer. The host device processor layer, the MPIO layer and the HBA layer are associated with at least a subset of the host devices 102, the switch fabric layer is associated with the SAN 104, and the storage array port layer and storage array processor layer are associated with the storage array 105. The storage array processors of the storage array processor layer may be viewed as examples of respective storage controllers 120 of the storage array 105.

Application processes of the host device processor layer generate IO operations that are processed by the MPIO layer for delivery to the storage array 105 over the SAN 104, which illustratively comprises one or more switch fabrics of the switch fabric layer. Paths are determined by instances of the path selection logic 114 for sending such IO operations to the storage array 105. More particularly, the path selection logic 114 determines appropriate paths over which to send particular IO operations to particular logical storage devices of the storage array 105. Non-disruptive migration of logical storage devices is illustratively provided utilizing instances of device mapper 115 in the MPIO layer.

The MPIO layer is an example of what is also referred to herein as a multi-path layer, and illustratively comprises one or more MPIO drivers 112 implemented in respective host devices 102. Each such MPIO driver illustratively comprises respective instances of path selection logic 114 and device mapper 115 configured as previously described. Additional or alternative layers and logic arrangements can be used in other embodiments.

As noted above, path selection logic 114 is configured to select different paths for sending IO operations from a given host device to storage array 105. These paths may include, for example, a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are mentioned by way of illustrative example only, and in many practical implementations there will typically be a much larger number of paths between the host devices 102 and the storage array 105, depending upon the specific system configuration and its deployed numbers of HBAs, switch fabrics and storage array ports. For example, each host device in the FIG. 1 embodiment can illustratively have a set of k paths to shared storage array 105, or alternatively different ones of the host devices 102 can have different numbers and types of paths to the storage array 105.

Some implementations of the system 100 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 100 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a "vendor unique" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible. The user-space portion of the MPIO driver 112-1 is illustratively associated with an Operating System (OS) kernel of the host device 102-1. Other MPIO driver arrangements are possible. For example, in some embodiments, an MPIO driver may be configured using a kernel-based implementation, and in such an arrangement may include only a kernel-space portion and no user-space portion.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

As indicated previously, the host devices 102 communicate directly with the storage array 105 using one or more storage access protocols such as SCSI, Internet SCSI (iSCSI), SCSI over FC (SCSI-FC), NVMe over FC (NVMe/FC), NVMe over Fabrics (NVMeF), NVMe over TCP (NVMe/TCP), and/or others. Host multi-pathing software can be configured to facilitate non-disruptive migration of logical storage devices as disclosed herein. For example, multi-pathing software residing on one or more of the host devices 102 (e.g., a server such as an ESXi server or an AIX server) is utilized in illustrative embodiments to support non-disruptive migration of logical storage devices.

In the FIG. 1 embodiment, the storage array 105 comprises a plurality of storage controllers 120 and a plurality of local caches 122. For example, in some embodiments, each of the storage controllers 120 has a different local cache or a different allocated portion of a global cache associated therewith, each illustratively a "local cache" of its corresponding storage controller, as the term "local cache" is broadly used herein, although numerous alternative arrangements are possible. The storage controllers 120 can be implemented as respective storage processors, directors or other storage system components configured to control storage system operations relating to processing of IO operations.

As indicated above, at least portions of the communications between the host devices 102 and the storage array 105 can utilize an in-band communication mechanism in which one or more predetermined commands in a designated storage access protocol are sent from the host device 102-1 to the storage array 105. Such predetermined commands can comprise, for example, read and/or write commands, sense commands (e.g., log sense and/or mode sense commands), "vendor unique" or VU commands, or combinations of multiple instances of these or other commands, in an otherwise standardized command format, such as a SCSI format, an NVMe format, or other type of format. A "command" as the term is broadly used herein can comprise a combination of multiple distinct commands.

It is also possible for the host devices 102 and the storage array 105 to communicate via one or more out-of-band communication mechanisms. For example, an out-of-band communication mechanism of this type can involve host management software of the host device 102-1 communicating with storage array management software of the storage array 105 over an IP network connection or other type of network connection.

As indicated previously, problems can arise when migrating one LUN or other logical storage device to another LUN or logical storage device, within the storage array 105 or in other contexts such as between source and target storage arrays. For example, it can be difficult to perform non-disruptive migration in a Linux native multi-pathing environment. Conventional approaches can require manual intervention by one or more administrators or other users, which is costly and inefficient.

Illustrative embodiments overcome these and other drawbacks of conventional practice by configuring the system 100 to include functionality for non-disruptive migration of logical storage devices, as will now be described in more detail.

It is assumed for some of the embodiments to be described that the MPIO drivers 112 of the host devices 102 comprise respective device mapper MPIO drivers operating in a Linux native multi-pathing environment. It is to be appreciated, however, that the disclosed techniques can be more generally applied to other environments, and accordingly should not be viewed as being limited to the Linux native multi-pathing environment.

In operation, the MPIO driver 112-1 is configured to control delivery of IO operations from its corresponding host device 102-1 to storage array 105 over selected ones of a plurality of paths through SAN 104, using its path selection logic 114-1, where the paths are associated with respective initiator-target pairs, the initiators being implemented on the host device 102-1 and the targets being implemented on the storage array 105. The MPIO driver 112-1 is further configured to control the migration of a first logical storage device associated with a first multi-path device to a second logical storage device associated with a second multi-path device.

The first and second multi-path devices mentioned above illustratively comprise respective request-based devices in the Linux native multi-pathing environment, and the mirror device illustratively comprises a block input-output based device in the Linux native multi-pathing environment.

Migrating the first logical storage device to the second logical storage device illustratively comprises suspending the first multi-path device, creating a proxy device for the first multi-path device, implementing a mirror device to provide a mirroring arrangement between the proxy device and the second multi-path device, inserting a request splitter between the first multi-path device and the mirror device, redirecting output of the first multi-path device to the request splitter, and resuming the first multi-path device.

Responsive to synchronization of the proxy device and the second multi-path device via the mirroring arrangement between the proxy device and the second multi-path device, the migrating of the first logical storage device to the second logical storage device illustratively further comprises suspending the first multi-path device, removing the request splitter, the mirror device and the proxy device, redirecting output of the first multi-path device to the second logical storage device, and resuming the first multi-path device.

In some embodiments, migrating the first logical storage device to the second logical storage device further comprises suspending the second multi-path device, redirecting output of the second multi-path device to the first logical storage device, and resuming the second multi-path device.

The above-noted redirecting output of the first multi-path device to the request splitter in some embodiments illustratively comprises removing one or more existing paths from a data structure associated with the first multi-path device, and inserting into the data structure at least one path to the request splitter. For example, the inserted path to the request splitter may be the only remaining path for the first multi-path device in the data structure.

Additionally or alternatively, the above-noted redirecting output of the first multi-path device to the second logical storage device illustratively comprises removing one or more existing paths from a data structure associated with the first multi-path device, and inserting into the data structure at least one path previously utilized by the second multi-path device to access the second logical storage device.

In some embodiments, redirecting output of the second multi-path device to the first logical storage device illustratively comprises removing one or more existing paths from a data structure associated with the second multi-path device, and inserting into the data structure at least one path previously utilized by the first multi-path device to access the first logical storage device.

The term "redirecting" as used herein is intended to be broadly construed, and should not be viewed as being limited in any way to the above-described example arrangements involving data structures that store path-related information.

The data structures referred to above are illustratively implemented in one or more memories of the host device 102-1 and accessible to the MPIO driver 112-1. Such data structures can be in the form of tables or other arrangements of entries, as will be appreciated by those skilled in the art.

At least a portion of such non-disruptive migration functionality is carried out by the device mapper 115-1 of the MPIO driver 112-1, in cooperation with the path selection logic 114-1. The MPIO driver 112-1 in the present embodiment is assumed to comprise a device mapper MPIO driver operating in a Linux native multi-pathing environment, although other MPIO drivers or host device components can be used.

In some embodiments, the first and second logical storage devices, which may be LUNs or other types of logical storage volumes, are assumed to both be located in the same storage array, namely, storage array 105. However, in other embodiments, the first and second logical storage devices can instead be in respective distinct first and second storage arrays of a given storage system.

The host device 102-1 is an example of what is more generally referred to herein as "at least one processing device" comprising a processor and a memory, with the processor being coupled to the memory. References herein to "at least one processing device" may instead comprise a portion of the host device 102-1, or at least a portion of multiple host devices 102, with each such host device implementing similar functionality. Other types of arrangements of one or more processing devices can be used to implement functionality for non-disruptive migration of logical storage devices as disclosed herein.

As indicated previously, the paths over which IO operations are delivered from the host device 102-1 to the storage array 105 under the control of the MPIO driver 112-1 are assumed to be associated with respective initiator-target pairs, with the initiators of the initiator-target pairs illustratively comprising respective HBAs of the host device 102-1 and the targets of the initiator-target pairs illustratively comprising respective storage array ports of the storage array 105. Other types of paths involving other types of initiators and targets can be used in other embodiments. Terms such as "initiator," "target" and "initiator-target pair" as used herein are therefore intended to be broadly construed.

Although described in the context of some embodiments as being performed by the MPIO driver 112-1 utilizing its path selection logic 114-1 and device mapper 115-1, one or more of the above-described operations in other embodiments can be performed elsewhere within the host device 102-1. Also, other ones of the MPIO drivers 112 and their respective other host devices 102 can be similarly configured.

An example of a process including operations of the type outlined above will be described below in conjunction with the flow diagram of FIG. 2. These and other operations referred to herein as being performed by one or more host devices operating in conjunction with one or more storage arrays of a storage system can in other embodiments involve additional or alternative system components, possibly including one or more external servers.

As noted above, the initiators of the initiator-target pairs illustratively comprise respective HBAs of the host device 102-1 and the targets of the initiator-target pairs comprise respective storage array ports of the storage array 105.

Negotiated rates of the respective particular initiator and the corresponding target illustratively comprise respective negotiated data rates determined by execution of at least one link negotiation protocol for an associated one of the paths.

In some embodiments, at least a portion of the initiators comprise virtual initiators, such as, for example, respective ones of a plurality of N-Port ID Virtualization (NPIV) initiators associated with one or more Fibre Channel (FC) network connections. Such initiators illustratively utilize NVMe arrangements such as NVMe/FC, although other protocols can be used. Other embodiments can utilize other types of virtual initiators in which multiple network addresses can be supported by a single network interface, such as, for example, multiple media access control (MAC) addresses on a single network interface of an Ethernet network interface card (NIC). Accordingly, in some embodiments, the multiple virtual initiators are identified by respective ones of a plurality of media MAC addresses of a single network interface of a NIC. Such initiators illustratively utilize NVMe arrangements such as NVMe/TCP, although again other protocols can be used.

In some embodiments, the NPIV feature of FC allows a single host HBA port to expose multiple World Wide Numbers (WWNs) to the SAN 104 and the storage array 105. A WWN or World Wide Identifier (WWID) is a unique identifier used in various types of storage technologies that may be implemented in illustrative embodiments herein, including, for example, SCSI, NVMe, FC, Parallel Advanced Technology Attachment (PATA), Serial Advanced Technology Attachment (SATA), Serial Attached SCSI (SAS) and others, and may be viewed as an example of what is more generally referred to herein as a virtual identifier. The NPIV feature is used, for example, when there are multiple IO producers on a given host device with a need to distinguish which IO is related to which producer.

One such case is a system involving virtual machines (VMs), where multiple VMs run on a single ESXi server with HBAs. All VMs are using all HBAs but there is a need to be able to distinguish which IO belongs to which VM, for example, in order to implement service level objectives (SLOs) between the various VMs, illustratively at an OS level. Each of the NPIV initiators behaves as if it is a "normal" or physical initiator, in that it logs into a storage array port, requires masking, etc. Another example of NPIV usage is in the context of AIX servers, where different logical partitions each use a different NPIV initiator over the same host HBA port.

Accordingly, in some embodiments, multiple virtual initiators are associated with a single HBA of the host device 102-1 but have respective unique identifiers associated therewith.

Additionally or alternatively, different ones of the multiple virtual initiators are illustratively associated with respective different ones of a plurality of virtual machines of the host device that share a single HBA of the host device, or a plurality of logical partitions of the host device that share a single HBA of the host device.

Again, numerous alternative virtual initiator arrangements are possible, as will be apparent to those skilled in the art. The term "virtual initiator" as used herein is therefore intended to be broadly construed. It is also to be appreciated that other embodiments need not utilize any virtual initiators. References herein to the term "initiators" are intended to be broadly construed, and should therefore be understood to encompass physical initiators, virtual initiators, or combinations of both physical and virtual initiators.

Aspects of non-disruptive migration of logical storage devices as disclosed herein are illustratively performed utilizing instances of device mapper 115 in respective ones of the MPIO drivers 112 of the multi-path layer, possibly operating in conjunction with their corresponding instances of path selection logic 114. However, it is to be appreciated that additional system components can participate in the disclosed functionality for non-disruptive migration of logical storage devices in illustrative embodiments. The term "non-disruptive migration" as used herein is intended to be broadly construed, so as to encompass a wide variety of additional or alternative arrangements for migrating one or more LUNs or other logical storage devices.

These and other illustrative embodiments disclosed herein provide functionality for non-disruptive migration of logical storage devices, with at least portions of that functionality being implemented using one or more MPIO drivers of a multi-path layer of at least one host device. The MPIO drivers illustratively comprise Linux native multi-path drivers suitably modified to implement the techniques disclosed herein. Other types of host multi-pathing software can be similarly modified to implement the techniques disclosed herein. Again, MPIO drivers are not required, and other types of host drivers or more generally other host device components can be used.

As described above, in illustrative embodiments disclosed herein, the host devices 102 are configured to interact with storage array 105 to provide non-disruptive migration of logical storage devices between host devices 102 and storage array 105.

A detailed example of an algorithm performed by a given one of the host devices 102-1 utilizing its MPIO driver 112-1 and its corresponding instances of path selection logic 114-1 and device mapper 115-1 will now be described. In the following description, a host device is also referred to herein as simply a "host." Similarly, a storage array is also referred to herein as simply an "array."

Additional aspects of the Linux native multi-pathing environment in the context of the example algorithm illustratively include the following.

Terminology dm-multipath: Driver that provides native multi-pathing functionality in Linux.

dm-mirror: Driver that provides mirroring functionality in Linux, may be viewed as an example of what is more generally referred to herein as a "mirror device."

device mapper: Framework provided by the Linux kernel for mapping physical block devices onto higher-level virtual block devices. Illustratively corresponds, for example, to device mapper 115-1 of MPIO driver 112-1.

dm device: A virtual block device created by device mapper.

block layer: Part of Linux kernel which implements the interface that applications and filesystems use to access various storage devices.

bio: Smallest unit of IO in Linux block layer.

request: A collection of bio that is coalesced to get better throughput from underlying layers.

Device Mapper Features

An example implementation of the device mapper 115-1 of the MPIO driver 112-1 in the Linux native multi-pathing environment illustratively has the following features:

1. For multi-pathing, dm-multipath along with device mapper creates a virtual block device (/dev/dm-<number>) for each LUN it manages. When an IO is sent to a dm-multipath device, internally it will be sent on any of the underlying native devices (e.g., /dev/sdX or/dev/nvmeXnY). By default, dm-multipath can accept "bio" or "request" as input from a layer above, but only dispatches "request" as output to the layer below, and so dm-multipath is generally considered a request-based device. The mpathy device is illustratively configured in the following manner, although alternative configurations can be used.

multipath-ll mpathy
    mpathy (36000d310049c6c000000000000000a08) dm-11 COMPELNT,Compellent Vol size=5.0G features='1 queue_if_no_path' hwhandler='1 alua' wp=rw
    '-+-policy='service-time 0' prio=50 status=active
    |-4:0:10:2 sdbj 67:208 active ready running
    |-4:0:3:2 sdr 65:16 active ready running
    |-5:0:19:2 sdhf 133:80 active ready running
    '-5:0:3:2 sdei 128:160 active ready running 2. For mirroring, such as in the context of a logical volume manager (LVM), dm-mirror along with device mapper also creates a virtual block device (/dev/dm-<number>). When an IO is sent to a dm-mirror device, internally it will be cloned to all the constituent underlying devices. The underlying devices can be other dm devices, native devices or even other types of block devices. The dm-mirror device can only accept "bio" from the layer above and dispatches "bio" to the layer below, and so dm-mirror is considered a bio-based device.

3. Device mapper allows stacking one device one dm device on top of another dm device as long as certain requirements are satisfied. One key requirement is that a bio-based dm device can be stacked on top of another bio-based or request-based device. But a request-based device can be stacked only on top of another request-based device.

4. Device mapper allows creation of new virtual devices on top of existing dm devices as long as the conditions in item 3 above are met.

Example Algorithm for Non-Disruptive Migration

As indicated above, it is possible to stack one dm device on top of another and to configure the system using techniques disclosed herein to migrate data from one LUN to another. However, a request-based dm-multipath device cannot be stacked on top of a bio-based dm-mirror device. This problem is solved herein by providing a request splitter that takes requests as inputs, splits them into bios and dispatches them below. Illustrative embodiments herein implement such an approach.

Consider a scenario where migration needs to be performed from one LUN to another, with mpathy as a first multi-path device associated with a source (old) LUN and mpathz as a second multi-path device associated with a target (new) LUN, such that the migration is from the source LUN to the target LUN.

The example algorithm in this scenario includes the following steps, illustratively performed primarily under the control of the MPIO driver 112-1 of host device 102-1, although it is to be appreciated that additional or alternative steps, possibly involving additional or alternative system components, can be used in other embodiments:

1. Create filesystem on mpathy and mount it to simulate an application using the source (old) device while the migration is done.

2. Create a proxy device mpathy-proxy, the same as mpathy with the same paths. This is needed as creating a mirror with mpathy will fail as mpathy is in use (mounted).

3. Suspend mpathy device. All application IOs will be suspended till the device is resumed.

4. Create a mirror, referred to as mirror-device, between mpathy-proxy and mpathz. This will immediately start to synchronize all data from mpathy-proxy to mpathz.

5. Insert request splitter driver. This involves creating a new dm device, /dev/request-splitter which will take requests from above, split them into bio and dispatch to the mirror-device below.

6. Update mpathy table, by removing all the native paths under it and then specifying request-splitter as the sole path under it.

7. Resume mpathy device. From this point onward, any IO that is sent to mpathy will go to request-splitter device that will split the requests into bios and sends them to mirror-device. From mirror-device, the IO will be cloned to both the source and target LUNs.

8. Wait for synchronization of both legs of the mirror-device to complete.

9. Suspend mpathy device again.

10. Remove request-splitter device.

11. Remove mirror-device.

12. Remove mpathy-proxy device.

13. Update mpathy table with the paths of mpathz device. Update mpathz device with the original paths of mpathy device.

14. Update/etc/multipath/bindings file to reflect the new configuration.

15. Resume mpathy device. Now all IOs sent to mpathy will go to the paths of the target (new) LUN.

16. Migration is complete.

The above example algorithm provides an efficient migration solution for non-disruptive migration in a Linux native multi-pathing environment.

It is to be appreciated that the particular steps of the algorithm described above are presented by way of illustrative example only, and additional or alternative steps can be used in other embodiments. Also, the order of the steps can be varied, and/or at least some of the steps can be performed at least in part in parallel with one another.

Also, embodiments are not limited to use in a Linux native multi-pathing environment, but are more generally applicable to other host multi-pathing environments.

Illustrative embodiments can be implemented, for example, in one or more MPIO drivers of one or more host devices, with such MPIO drivers collectively providing a multi-path layer of the host devices.

For example, some embodiments are implemented though modification of otherwise conventional multi-pathing software, such as Linux native multi-pathing software. Other embodiments can be implemented in other MPIO drivers from various multi-pathing software vendors.

Illustrative embodiments disclosed herein can provide non-disruptive migration of logical storage devices for a wide variety of different types of host devices, such as host devices comprising ESXi servers or AIX servers.

At least portions of the above-described algorithms and other related techniques and functionality disclosed herein are illustratively implemented by a given MPIO driver on a corresponding host device, and similarly by other MPIO drivers on respective other host devices. Such MPIO drivers illustratively form a multi-path layer or MPIO layer comprising multi-pathing software of the host devices. Other types of multi-pathing software and host drivers can be used in other embodiments. Additionally or alternatively, other host device components can be used to implement at least portions of the disclosed functionality for non-disruptive migration of logical storage devices.

Additional examples of arrangements for non-disruptive migration of logical storage devices will be described elsewhere herein in conjunction with the embodiments of FIGS.

2 and 3. Other types of arrangements for non-disruptive migration of logical storage devices can be used in other embodiments.

These and other functions related to non-disruptive migration of logical storage devices that are referred to herein as being performed by or under the control of the MPIO drivers 112 through interaction with the storage array 105 can in some embodiments be performed at least in part outside of MPIO drivers 112 utilizing other system components.

The above-described functions associated with non-disruptive migration of logical storage devices in the MPIO driver 112-1 in some embodiments are carried out at least in part under the control of its device mapper 115-1, illustratively operating in cooperation with path selection logic 114-1. For example, the device mapper 115-1 is illustratively configured to control performance of portions of an algorithm comprising the steps of the process in the flow diagram to be described below in conjunction with FIG. 2. In other embodiments, one or more such steps can be more generally performed by the host device 102-1.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to deliver IO operations from its corresponding one of the sets of IO queues 110 to the storage array 105 over selected paths through the SAN 104, and to perform the disclosed functionality for non-disruptive migration of logical storage devices.

Accordingly, functionality described above in the context of the first MPIO driver 112-1 and the first host device 102-1 is assumed to be similarly performed by each of the other MPIO drivers 112 and/or more generally by their respective host devices 102.

The MPIO drivers 112 may be otherwise configured utilizing well-known multi-pathing software functionality, such as Linux native multi-pathing functionality. Such conventional multi-pathing software functionality is suitably modified in illustrative embodiments disclosed herein to support non-disruptive migration of logical storage devices.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVMe, as described in the NVMe Specification, Revision 1.3, May 2017, which is incorporated by reference herein. Other NVMe storage access protocols of this type that may be utilized in illustrative embodiments disclosed herein include NVMe/FC, NVMeF and NVMe/TCP.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

The storage array 105 in the present embodiment may comprise additional components not explicitly shown in the figure, such as a response time control module and IO operation priority queues, illustratively configured to make use of the above-described persistent memory. For example, the response time control module may be used to implement storage array based adjustments in response time for particular IO operations based at least in part on service level objective (SLO) information stored by the storage array 105 in its persistent memory. The response time control module is assumed to operate in conjunction with the above-noted IO operation priority queues.

The storage array 105 illustratively utilizes its IO operation priority queues to provide different levels of performance for IO operations. For example, the IO operation priority queues may have respective different priority levels. The storage array 105 may be configured to provide different priority levels for different ones of the IO operations by assigning different ones of the IO operations to different ones of the IO operation priority queues. The IO operation priority queues are illustratively associated with respective SLOs for processing of IO operations in the storage array 105. Process tags may be used in assigning different ones of the IO operations to different ones of the IO operation priority queues, as disclosed in U.S. Pat. No. 10,474,367, entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks, using interfaces and protocols as previously described. Numerous other interfaces and associated protocols can be used in other embodiments.

The storage array 105 in some embodiments may be implemented as part of cloud infrastructure in the form of a cloud-based system. Such a cloud-based system can additionally or alternatively be used to implement other portions of system 100, such as one or more of the host devices 102.

The storage devices 106 of the storage array 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more Unity™ or PowerMax™ storage arrays, commercially available from Dell Technologies.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, and MPIO drivers 112, including their corresponding instances of path selection logic 114 and device mapper 115, can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 220, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes.

Figure 2:
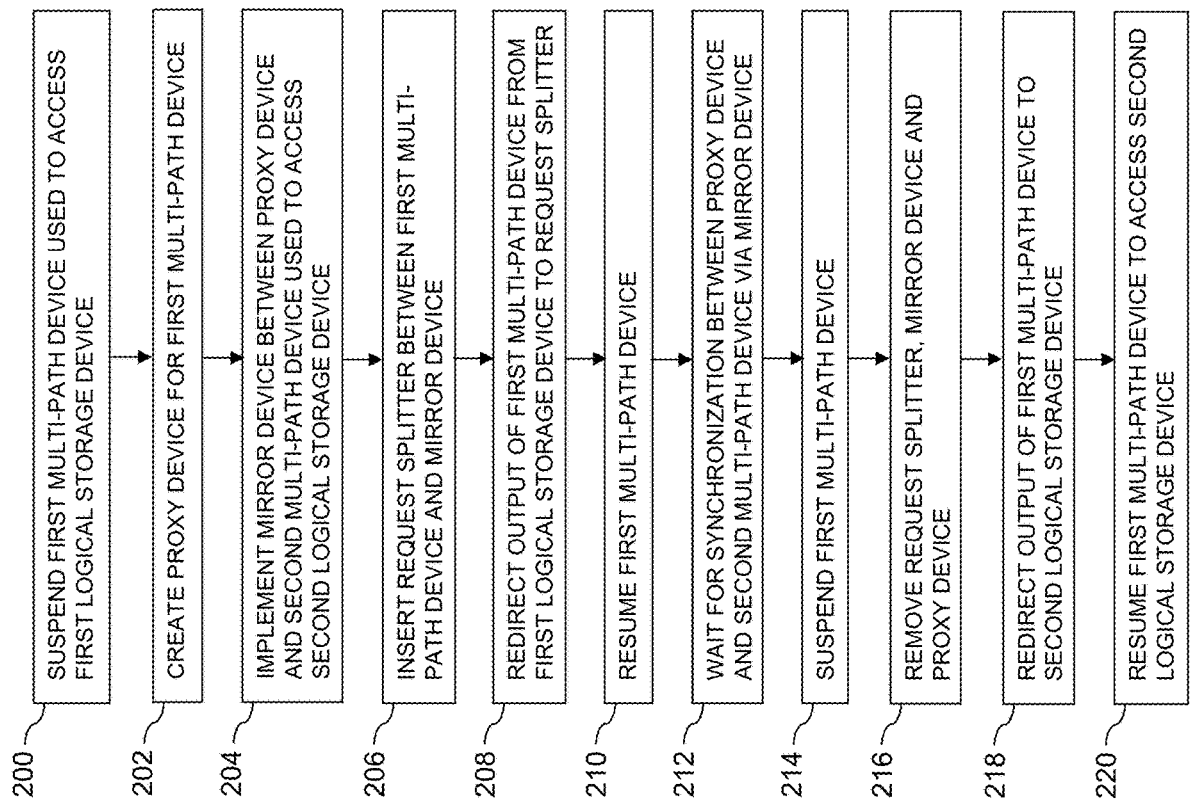
FIG. 2 is a flow diagram of a process for non-disruptive migration of logical storage devices in an illustrative embodiment.

The steps of the FIG. 2 process are illustratively performed at least in part by or under the control of a multi-path layer comprising one or more MPIO drivers of respective host devices, cooperatively interacting with a storage array or other storage system, and possibly with some participation by one or more additional components such as an external server providing management functionality. Other arrangements of additional or alternative system components can be configured to perform at least portions of one or more of the steps of the FIG. 2 process in other embodiments.

The steps shown in FIG. 2 more specifically relate to processing performed by a given host device, also referred to herein as simply a "host," interacting with a storage array. It is assumed that similar processes are implemented for each of a plurality of additional hosts that interact with the storage array.

The FIG. 2 process generally involves migrating a first logical storage device associated with a first multi-path device to a second logical storage device associated with a second multi-path device. The first and second multi-path devices are illustratively configured by an MPIO driver of the host, which is assumed to be a device mapper MPIO driver operating in a Linux native multi-pathing environment as described elsewhere herein. The first and second multi-path devices are illustratively utilized to access the respective first and second logical storage devices, which are assumed for this embodiment to be in the same storage array, but could be in different storage arrays. The first and second multi-path devices illustratively comprise respective request-based devices in the Linux native multi-pathing environment.

In step 200, the first multi-path device used to access the first logical storage device is suspended.

In step 202, a proxy device is created for the first multi-path device.

In step 204, a mirror device is implemented between the proxy device and the second multi-path device used to access the second logical storage device. The mirror device is configured to provide a mirroring arrangement that illustratively includes two "legs" corresponding to the proxy device and the second multi-path device, respectively. The mirror device illustratively comprises a block input-output based device in a Linux native multi-pathing environment.

In step 206, a request splitter is inserted between the first multi-path device and the mirror device.

In step 208, output of the first multi-path device is redirected from the first logical storage device to the request splitter. Redirecting output of the first multi-path device to the request splitter illustratively comprises removing one or more existing paths from a data structure associated with the first multi-path device, and inserting into the data structure at least one path to the request splitter. The inserted path to the request splitter is illustratively the only remaining path for the first multi-path device in the data structure. Such a data structure is illustratively maintained in a memory of the host and is accessible to the MPIO driver, and can comprise, for example, one or more tables or other arrangements for storing path-related information for one or more multi-path devices.

In step 210, the previously-suspended first multi-path device is resumed.

In step 212, the process waits for synchronization between the proxy device and the second multi-path device via the mirror device. This is also referred to herein as synchronization between the two legs of the mirroring arrangement.

In step 214, the first multi-path device is once again suspended.

In step 216, the request splitter, mirror device and proxy device are removed. Terms such as "removed" as used herein are intended to be broadly construed so as to encompass, for example, at least temporary deactivation of the corresponding device.

In step 218, output of the first multi-path device is redirected to the second logical storage device. Redirecting output of the first multi-path device to the second logical storage device illustratively comprises removing one or more existing paths from the data structure associated with the first multi-path device, illustratively the above-noted path to the request splitter, and inserting into the data structure at least one path previously utilized by the second multi-path device to access the second logical storage device.

In step 220, the first multi-path device is once again resumed to access the second logical storage device.

At this point the migration process may be considered complete.

However, it should be noted that the process can include additional or alternative steps. For example, the process can further include additional steps such as suspending the second multi-path device, redirecting output of the second multi-path device to the first logical storage device, and resuming the second multi-path device. In an arrangement of this type, redirecting output of the second multi-path device to the first logical storage device illustratively comprises removing one or more existing paths from a data structure associated with the second multi-path device, and inserting into the data structure at least one path previously utilized by the first multi-path device to access the first logical storage device.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for non-disruptive migration of logical storage devices. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different arrangements for non-disruptive migration of logical storage devices within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Referring now to FIG. 3, an example process 300 for non-disruptive migration of a LUN in a Linux native multi-pathing environment is shown. The process is illustrated by the sequence of figures denoted as FIGS. 3A through 3L, which collectively comprise FIG. 3.

Figure 3A:
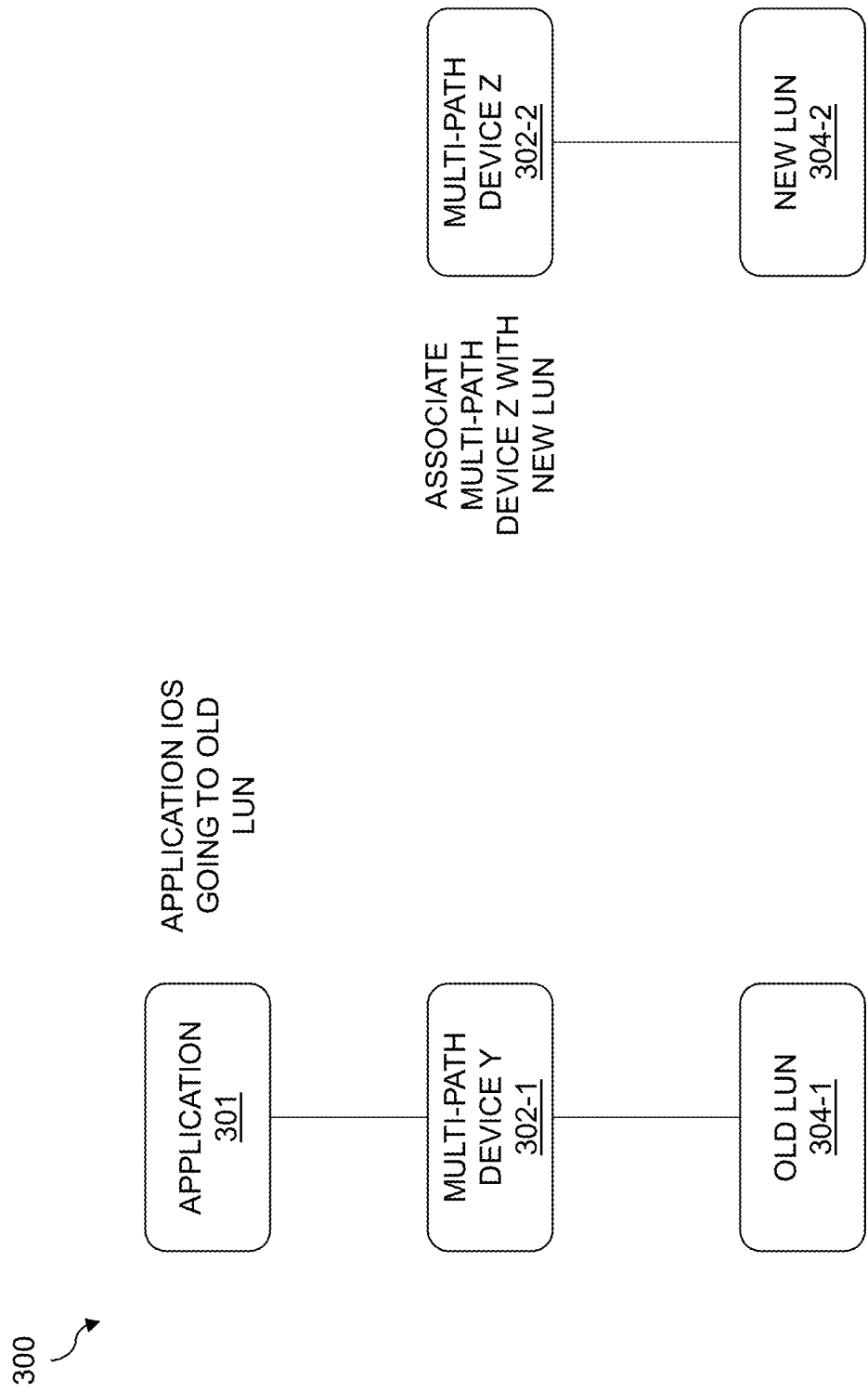
FIGS. 3A through 3L show an example implementation of a process for non-disruptive migration of logical storage devices in a Linux native multi-pathing environment in an illustrative embodiment. These figures are collectively referred to herein as FIG. 3.

With reference initially to FIG. 3A, an application 301 illustratively generates IOs for delivery to a storage array. The example process 300 generally involves migration of a first logical storage device associated with a first multi-path device to a second logical storage device associated with a second multi-path device. The first and second multi-path devices are more particularly denoted as respective multi-path devices 302-1 and 302-2, also referred to as multi-path device Y and multi-path device Z, respectively. The first and second logical storage devices are more particularly denoted as respective LUNs 304-1 and 304-2, also referred to as old LUN and new LUN, respectively. The application 301 accesses old LUN 304-1 via multi-path device Y. More particularly, IOs generated by application 301 are directed to old LUN 304-1 over selected ones of the paths supported by the multi-path device Y. The multi-path device Z is associated with the new LUN 304-2.

Figure 3B:
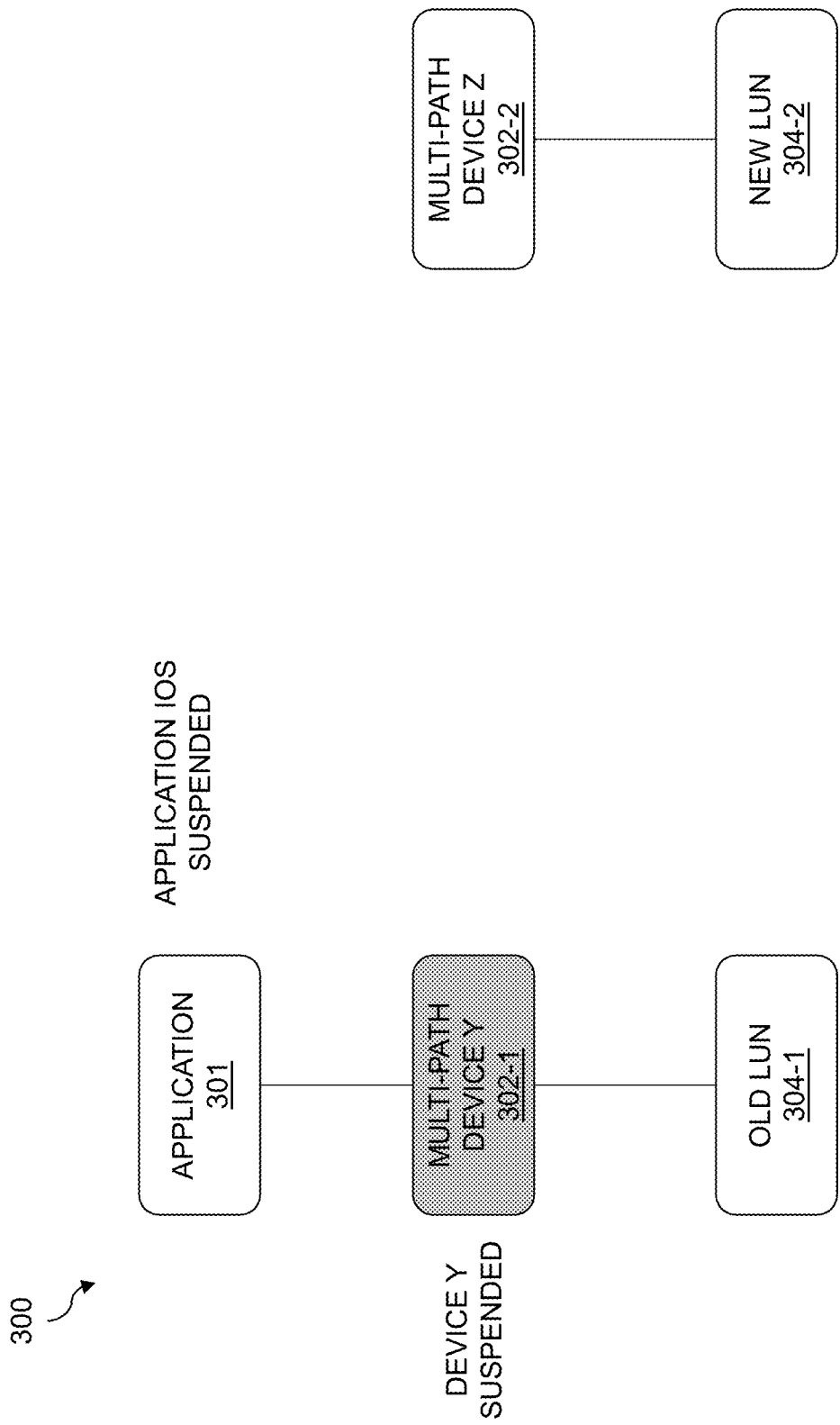

In FIG. 3B, the application IOs are temporarily suspended, and multi-path device Y is suspended.

Figure 3C:
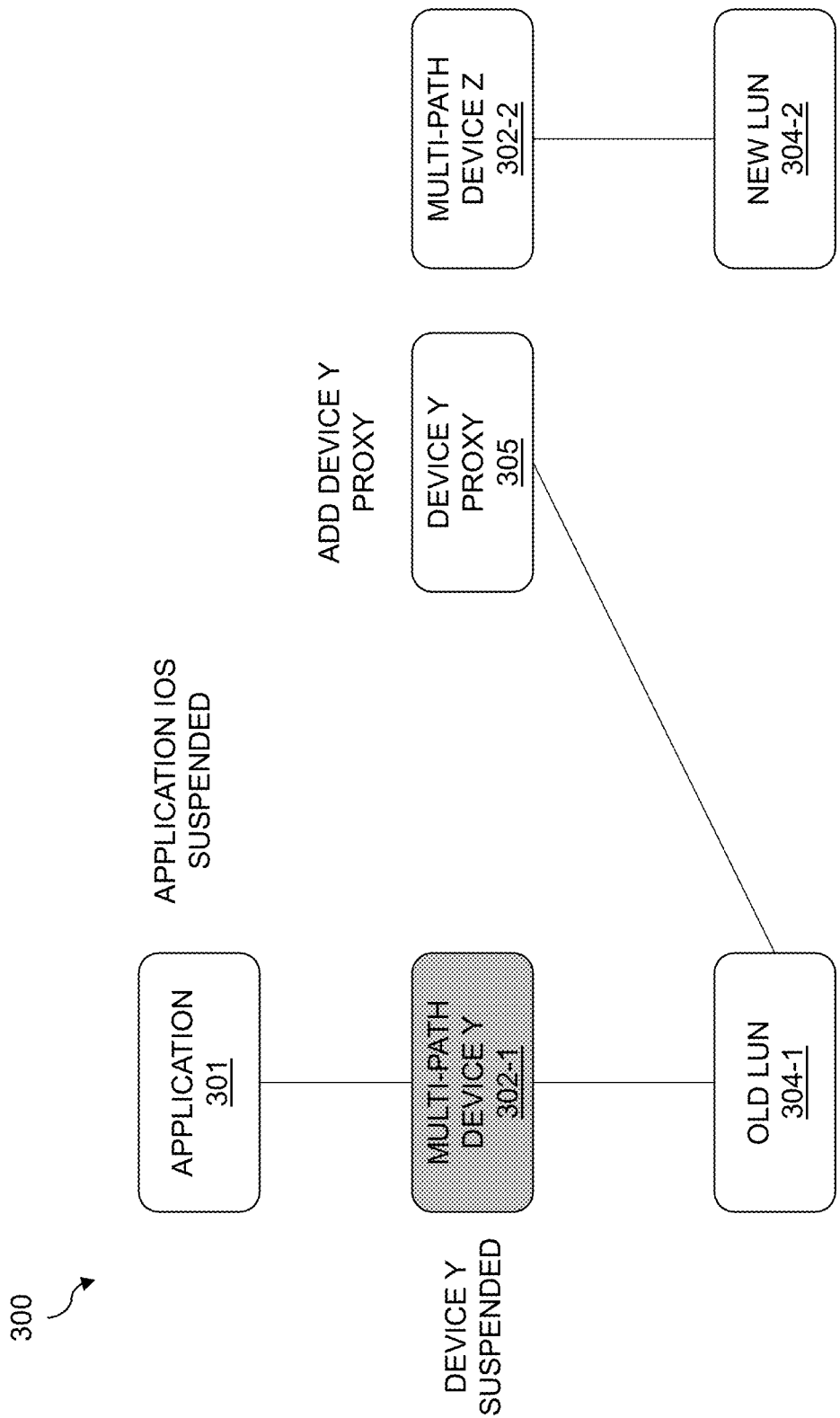

In FIG. 3C, a proxy device 305 for multi-path device Y is added as shown, and is also referred to in the figure as device Y proxy. Like multi-path device Y, the proxy device 305 is associated with the old LUN 304-1, and illustratively includes the same path configuration as multi-path device Y.

Figure 3D:
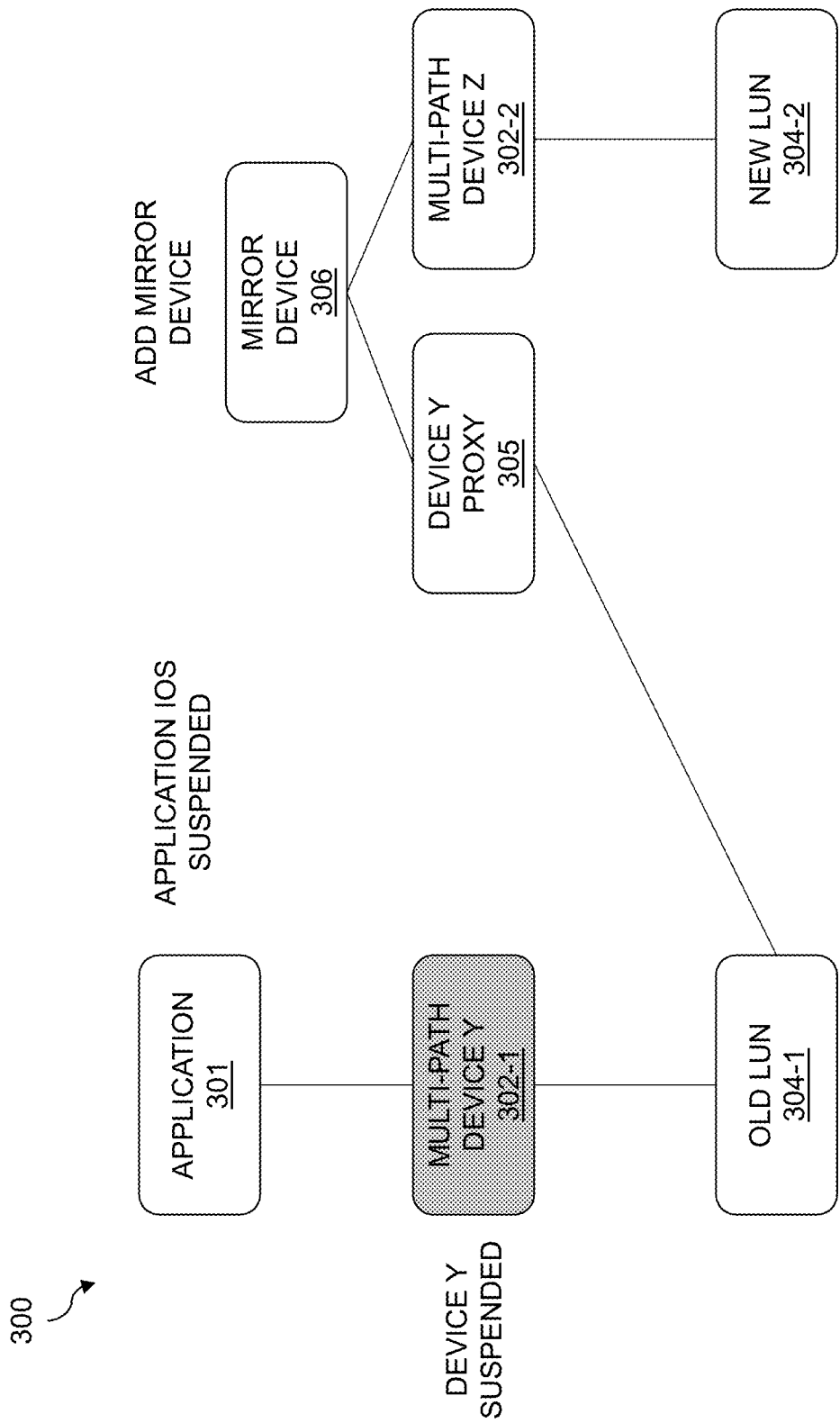
Figure 3E:
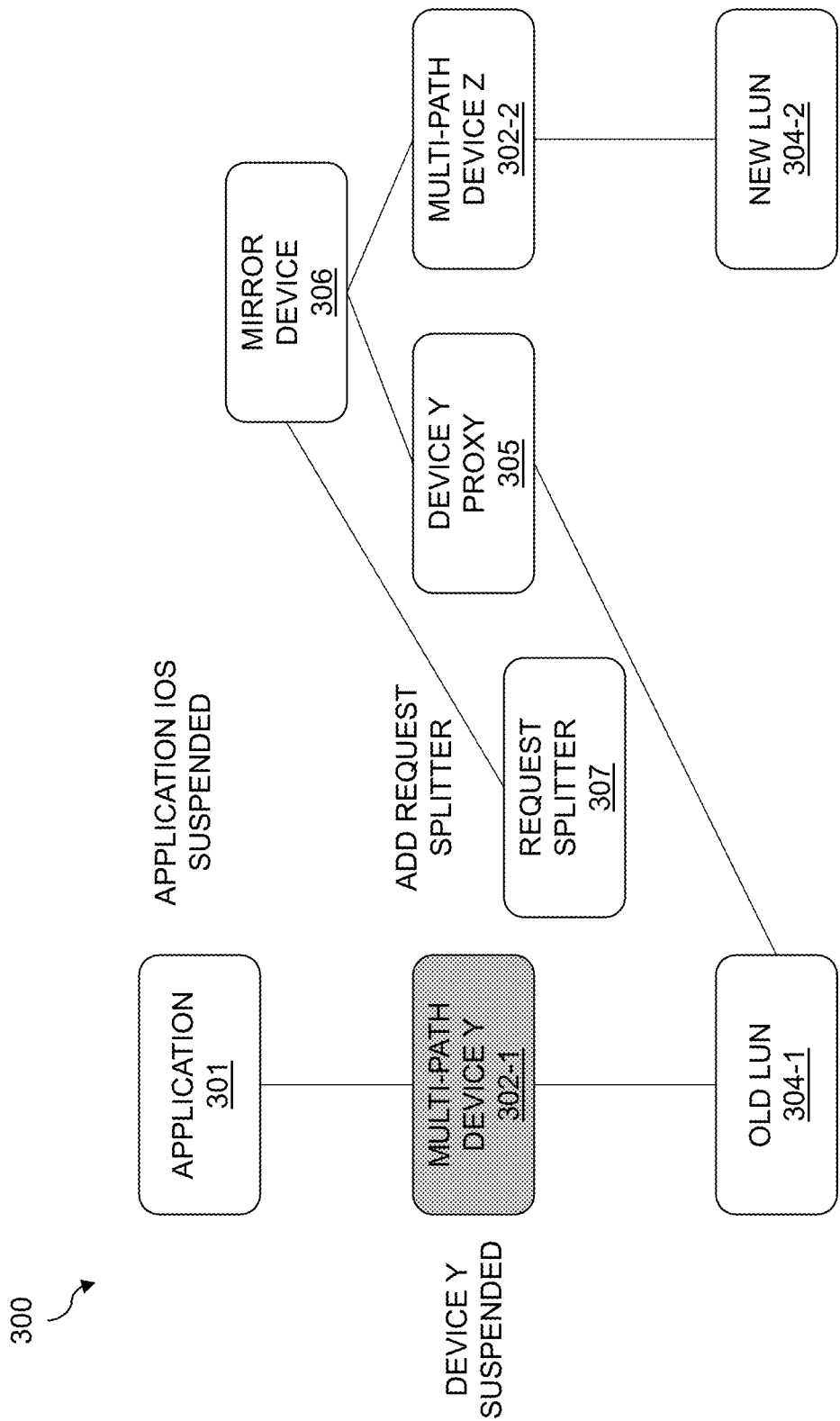

In FIG. 3D, a mirror device 306 is implemented to provide a mirroring arrangement between the proxy device 305 and the multi-path device Z. The proxy device 305 and the multi-path device Z represent the two "legs" of the mirroring arrangement provided by the mirror device 306. Other types of mirroring arrangements can be used in other embodiments, and the term "mirroring arrangement" as used herein is therefore intended to be broadly construed. In FIG. 3E, a request splitter 307 is added and coupled to the mirror device 306 as illustrated in the figure.

Figure 3F:
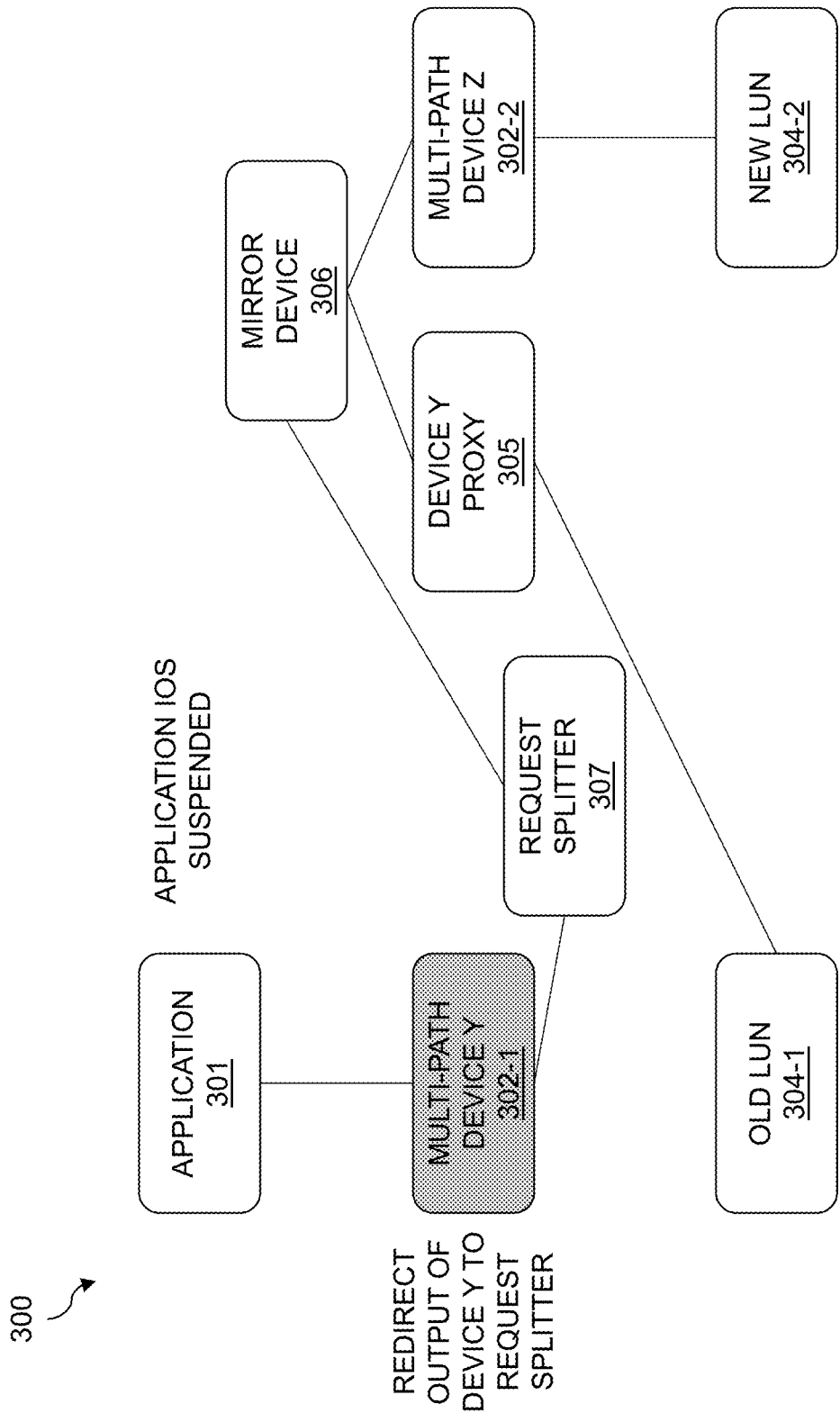

In FIG. 3F, output of multi-path device Y is redirected to the request splitter 307, in the manner described elsewhere herein.

Figure 3G:
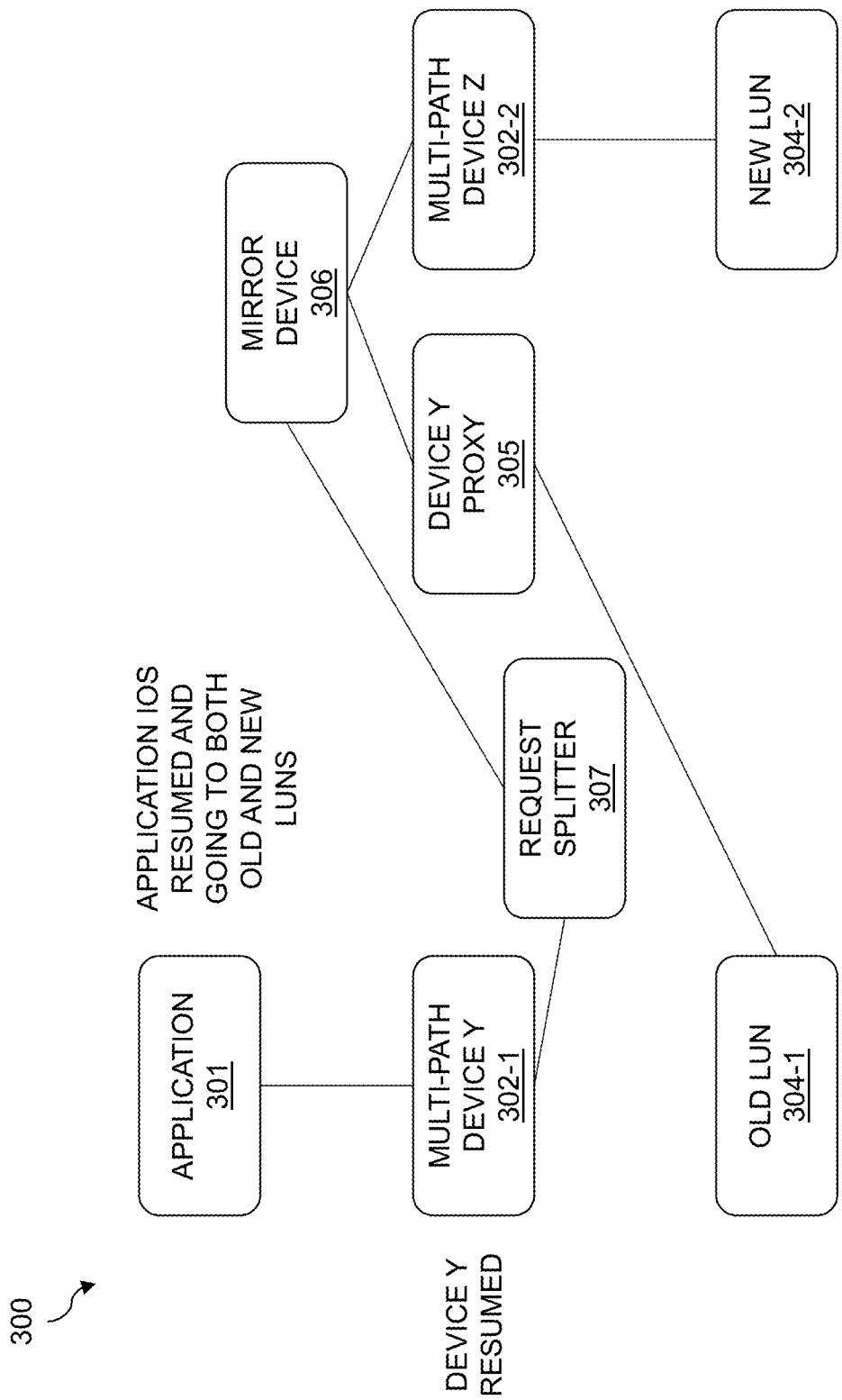

In FIG. 3G, the multi-path device Y is resumed. The application IOs are also resumed and are now going to both the old LUN 304-1 and the new LUN 304-2 via the mirroring arrangement established using the mirror device 306.

Figure 3H:
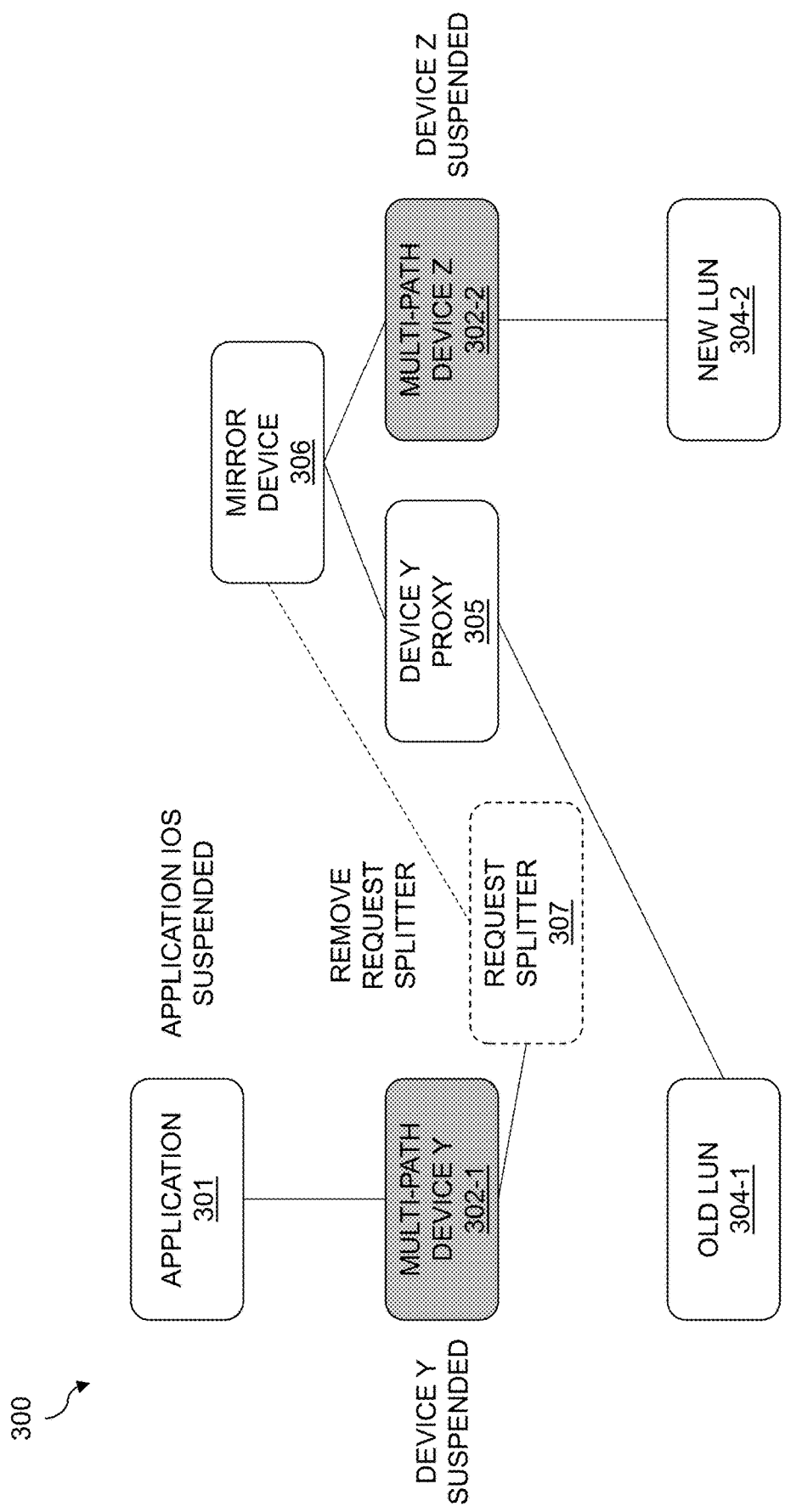

In FIG. 3H, responsive to synchronization of the proxy device 305 and the multi-path device Z via the mirroring arrangement, the multi-path device Y is again suspended, multi-path device Z is suspended, and application IOs are also suspended. The request splitter 307 is removed.

Figure 3I:
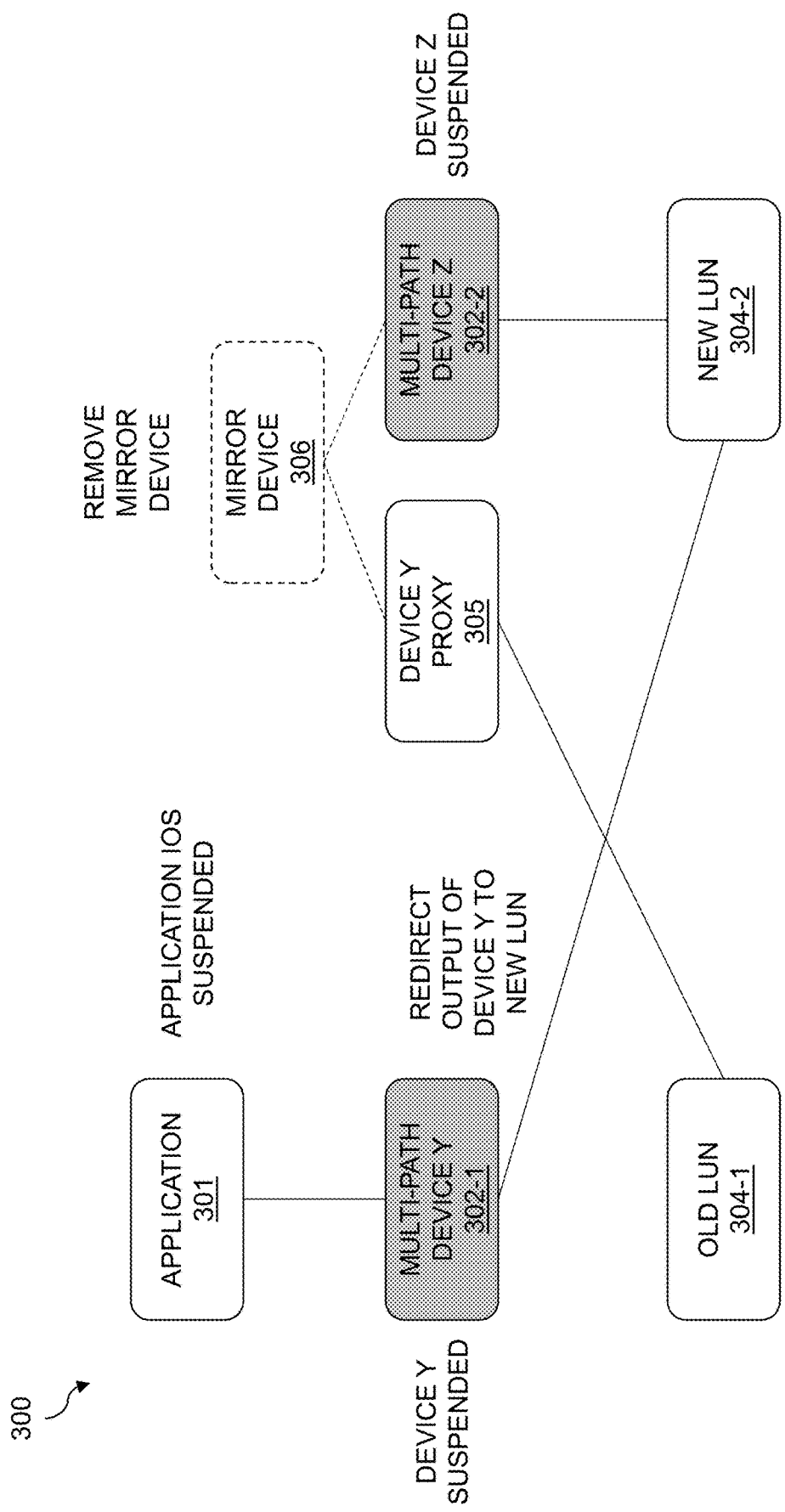

In FIG. 3I, the mirror device 306 is removed, and the output of multi-path device Y is redirected to the new LUN 304-2.

Figure 3J:
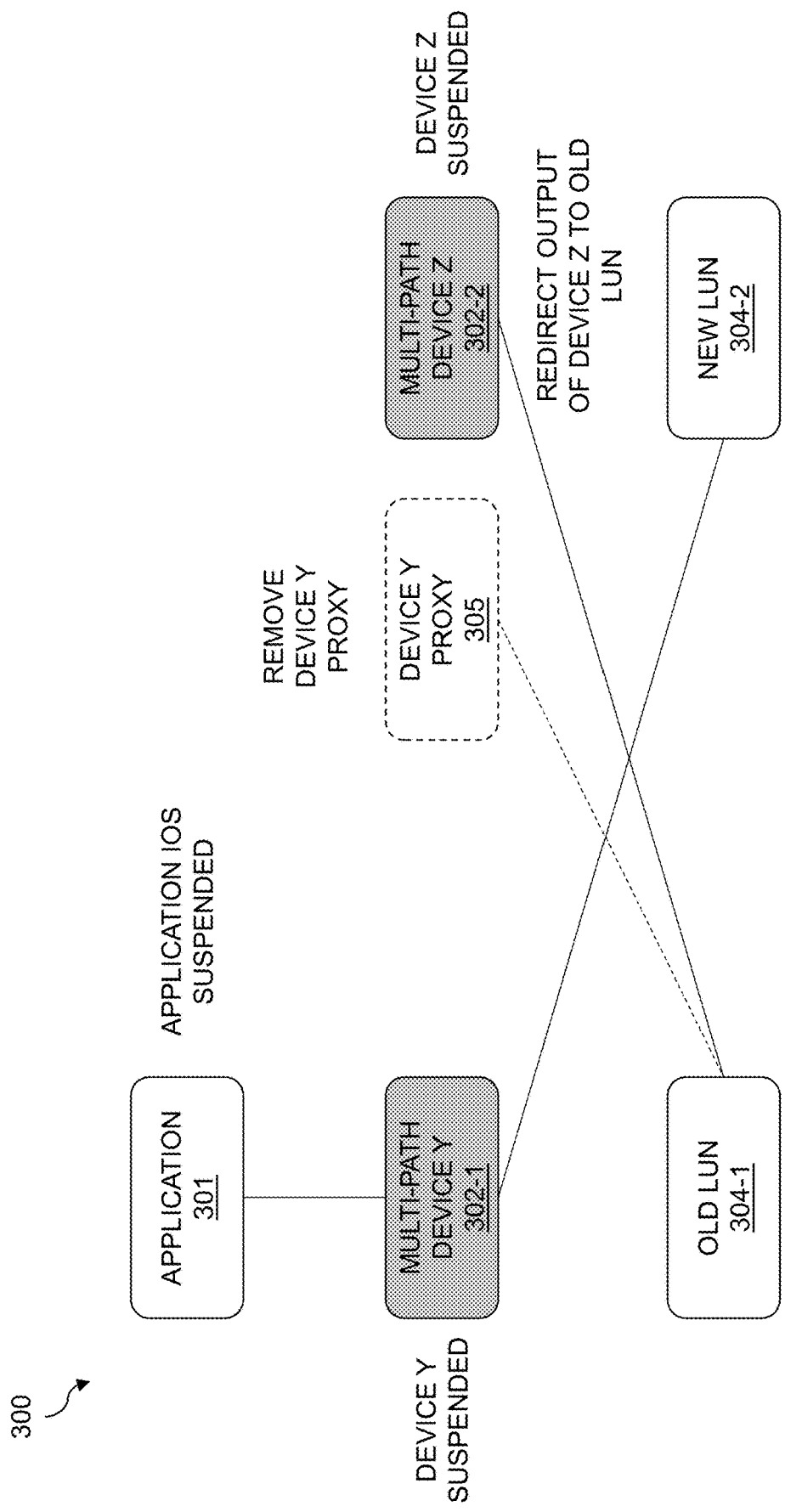

In FIG. 3J, the proxy device 305 is removed, and the output of multi-path device Z is redirected to the old LUN 304-1.

Figure 3K:
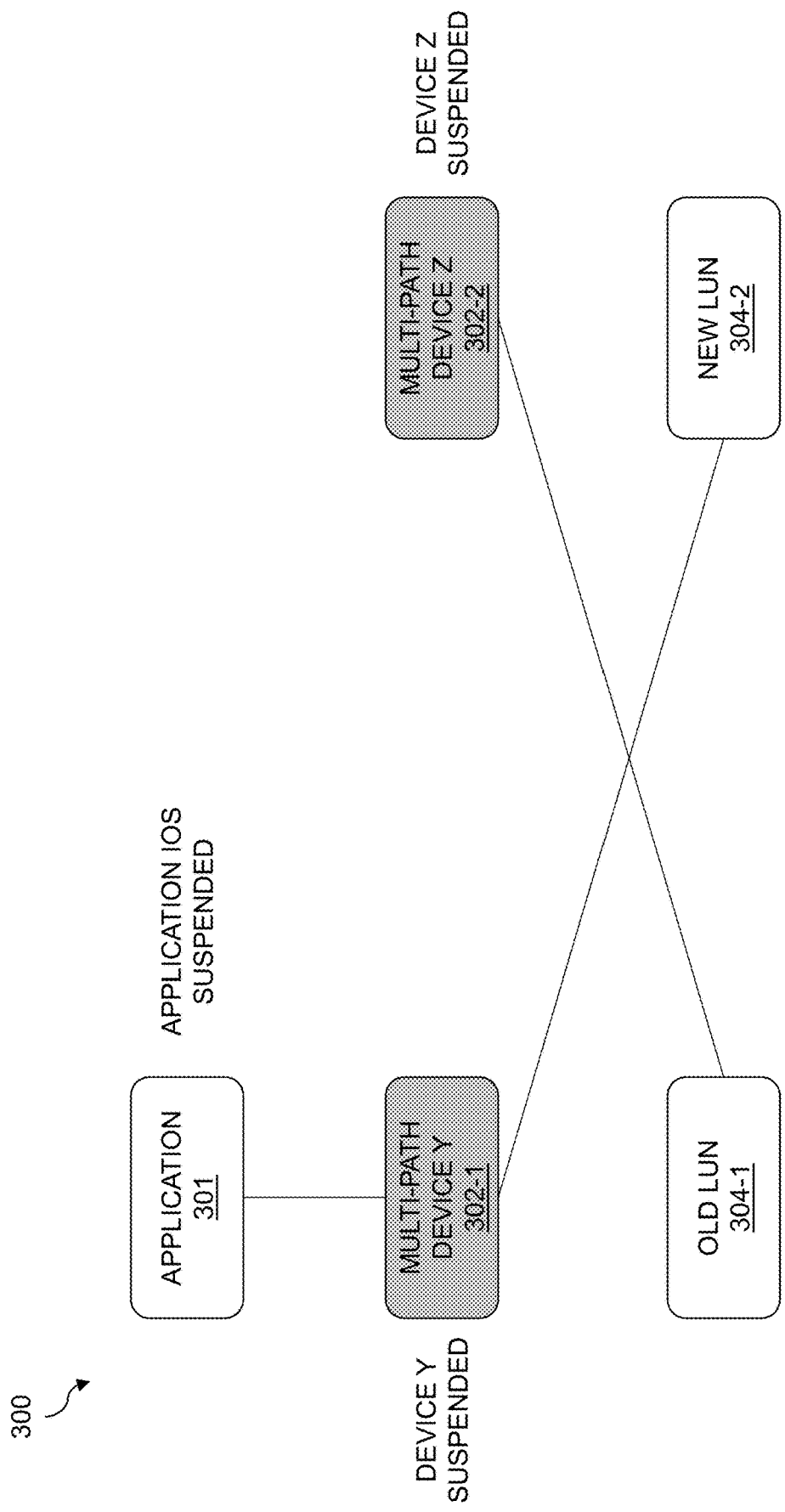

In FIG. 3K, the resulting configuration is shown, with application IOs, multi-path device Y and multi-path device Z all still suspended, and with request splitter 307, the mirror device 306 and the proxy device 305 all removed.

Figure 3L:
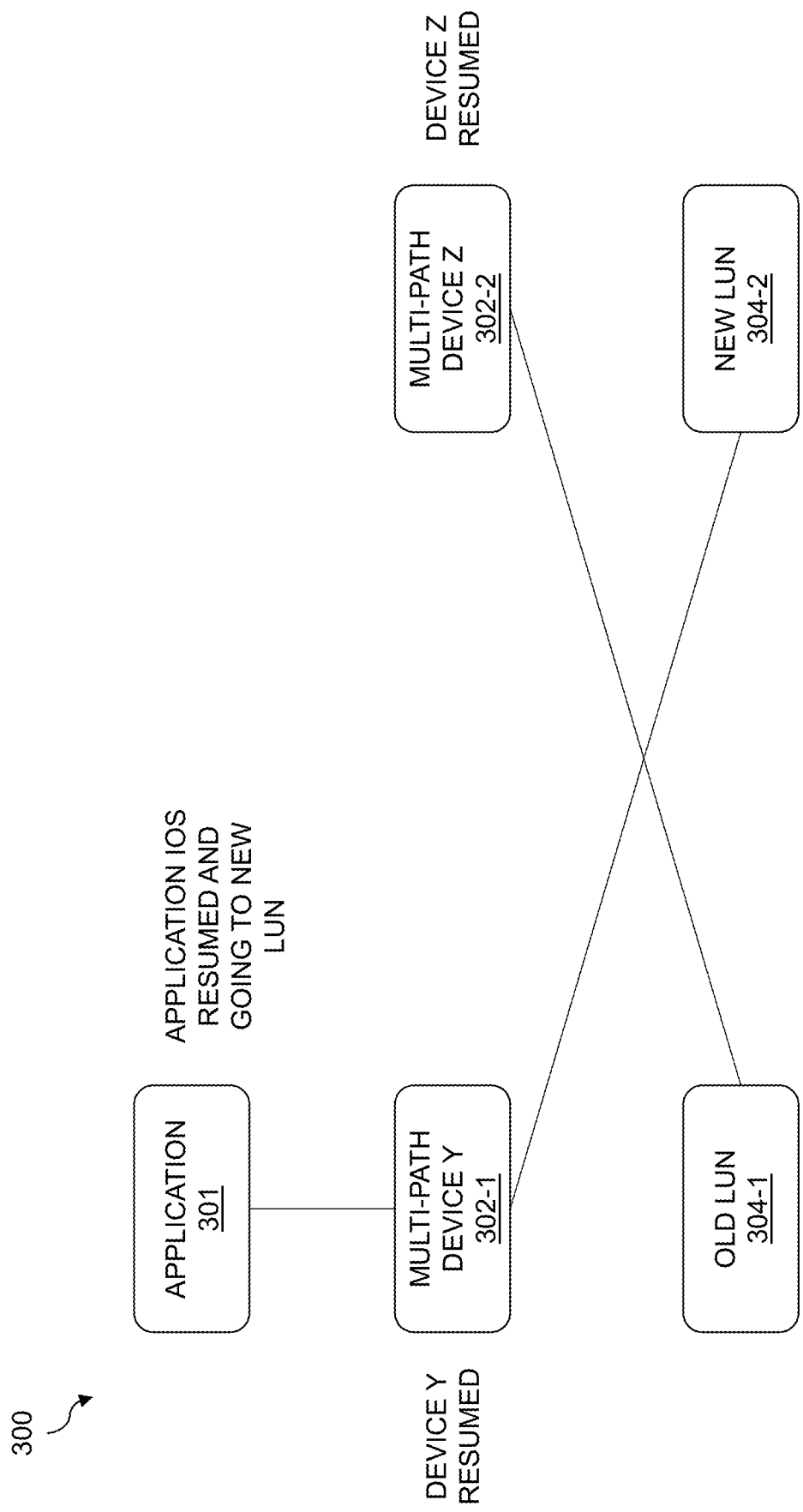

In FIG. 3L, the multi-path device Y is resumed and the application IOs are resumed. The application IOs are now directed via multi-path device Y to the new LUN 304-2. The multi-path device Z is also resumed and its output is directed to the old LUN 304-1. Alternatively, the multi-path device Z and old LUN 304-1 can be removed.

Additional details regarding aspects of one possible implementation of the example process of FIG. 3 can be seen in the attached Appendix.

The above-described processes, algorithms and other features and functionality disclosed herein are presented by way of illustrative example only, and other embodiments can utilize additional or alternative arrangements.

Also, as mentioned previously, different instances of the above-described processes, algorithms and other techniques for non-disruptive migration of logical storage devices can be performed using different system components.

For example, various aspects of functionality for non-disruptive migration of logical storage devices in some embodiments can be implemented at least in part using one or more servers that are external to a storage array 105 or other type of storage system. Also, processing logic can be implemented using other types of host drivers, such as, for example, iSCSI drivers, or more generally other host device components.

The particular arrangements described above for non-disruptive migration of logical storage devices are therefore presented by way of illustrative example only. Numerous alternative arrangements of these and other features can be used in implementing the non-disruptive migration of logical storage devices in other illustrative embodiments.

As indicated previously, the illustrative embodiments disclosed herein can provide a number of significant advantages relative to conventional arrangements.

For example, some embodiments are advantageously configured to provide highly efficient and effective non-disruptive migration of logical storage devices between host devices and a storage array or other storage system.

Illustrative embodiments provide particularly effective techniques for non-disruptive migration in a Linux native multi-pathing environment, but are suitable for use in other types of environments.

Various aspects of functionality associated with non-disruptive migration of logical storage devices as disclosed herein can be implemented in a host device, in a storage system, or partially in a host device and partially in a storage system, and additionally or alternatively using other arrangements of one or more processing devices each comprising at least a processor and a memory coupled to the processor.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems implemented at least in part using virtualization infrastructure such as virtual machines and associated hypervisors. For example, virtual machines provided in such systems can be used to implement a fast tier or other front-end tier of a multi-tier storage system in illustrative embodiments. A capacity tier or other back-end tier of such a multi-tier storage system can be implemented using one or more object stores.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114 and device mapper 115 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, storage controllers, processors, memories, IO queues, MPIO drivers, initiators, targets, path selection logic, device mappers, and additional or alternative components. Also, the particular configurations of system and device elements and associated processing operations illustratively shown in the drawings can be varied in other embodiments.

For example, a wide variety of different host device and storage system configurations and associated arrangements for non-disruptive migration of logical storage devices can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

APPENDIX

Example pseudocode for implementing non-disruptive migration in illustrative embodiments is provided below.

[root@abc123~]#   ./setup_dm_migration.sh   mpathy mpathz-noprompt

Configuration before migration . . .

========================================== multipath-ll mpathy mpathy (36000d310049c6c000000000000000a08) dm-11
   COMPELNT,Compellent Vol size=5.0G features='1 queue_if_no_path' hwhandler='1 alua' wp=rw
'-+-policy='service-time 0' prio=50 status=active
   |-4:0:10:2 sdbj 67:208 active ready running
   |-4:0:3:2 sdr 65:16 active ready running
   |-5:0:19:2 sdhf 133:80 active ready running
   '-5:0:3:2 sdei 128:160 active ready running multipath-ll mpathz mpathz (36000d310049c6c000000000000000a06) dm-10
   COMPELNT,Compellent Vol size=5.0G features='1 queue_if_no_path' hwhandler='1 alua' wp=rw
'-+-policy='service-time 0' prio=50 status=active
   |-4:0:10:1 sdbi 67:192 active ready running
   |-4:0:3:1 sdq 65:0 active ready running
   |-5:0:19:1 sdhe 133:64 active ready running
   '-5:0:3:1 sdeh 128:144 active ready running dmsetup table mpathy 0 10485760 multipath 1 queue_if_no_path 1 alua 1 1 service-time 0 4 2 67:208 1 1 65:16 1 1 133:80 1 1 128:160 1 1 dmsetup table mpathz 0 10485760 multipath 1 queue_if_no_path 1 alua 1 1 service-time 0 4 2 67:192 1 1 65:0 1 1 133:64 1 1 128:144 1 1

Get a native device of the source dm device . . .

==========================================

Native device: sdbj

Suspending source dm device . . . IOs to the source device will be suspended till a resume is done . . .

```
#dmsetup suspend—nolockfs mpathy
#dmsetup info mpathy
Name: mpathy
State: SUSPENDED
Read Ahead: 8192
Tables present: LIVE
Open count: 0
Event number: 0
Major, minor: 253, 11
Number of targets: 1
UUID: mpath-36000d310049c6c000000000000000a08
Creating a Dm-Multipath Mpathy-Proxy Device . . .

#dmsetup create mpathy-proxy--table "0 10485760 mul-
    tipath 1 queue_if_no_path 1 alua 1 1 service-time 0 4
    2 67:208 1 1 65:16 1 1 133:80 1 1 128:160 1 1"
#dmsetup info mpathy-proxy
Name: mpathy-proxy
State: ACTIVE
Read Ahead: 8192
Tables present: LIVE
Open count: 0
Event number: 0
Major, minor: 253, 30
Number of targets: 1
Creating a dm-mirror device, mirror-mpathy-mpathz,
    between the proxy and the target device . . .

#dmsetup create mirror-mpathy-mpathz—table "0
    10485760 mirror core 1 1024 2/dev/mapper/mpathy-
    proxy 0/dev/mapper/mpathz 0 1 handle_errors"
#dmsetup info mirror-mpathy-mpathz
Name: mirror-mpathy-mpathz
State: ACTIVE
Read Ahead: 256
Tables present: LIVE
Open count: 0
Event number: 0
Major, minor: 253, 31
Number of targets: 1
#dmsetup status mirror-mpathy-mpathz
0 10485760 mirror 2 253:30 253:10 14/10240 1 AA 1 core
Load request splitter driver that creates a block device,
    request-splitter . . .

#insmod
/emc/marapg/git1/ppdev/pp2dev/src/driver/base/
    i386_linux/rhel82_x8664/emcpreqsplitter.ko
mpathDevPath="/dev/mapper/mpathy"       nativeDev-
    Path="/dev/sdbj"
mirrorDevPath="/dev/mapper/mirror-mpathy-mpathz"
\#lsmod|grep emcpreqsplitter
emcpreqsplitter 16384 0
#ls-1/dev/request-splitter
brw-rw- - - 1 root disk 252, 0 May 25 08:27/dev/request-
    splitter
dev_t of request-splitter block device: 252:0
Update table of the source device by inserting the request-
    splitter device as the sole path under it . . .

#dmsetup reload mpathy—table "0 10485760 multipath 1
    queue_if_no_path 0 1 1 round-robin 0 1 1 252:0 1000"
Resuming the source dm device . . .

#dmsetup resume mpathy
dmsetup info mpathy
Name: mpathy
State: ACTIVE
Read Ahead: 8192
Tables present: LIVE
Open count: 0
Event number: 0
Major, minor: 253, 11
Number of targets: 1
UUID: mpath-36000d310049c6c000000000000000a08
dmsetup table mpathy
0 10485760 multipath 1 queue_if_no_path 0 1 1 round-
    robin 0 1 1 252:0 1
Waiting for both the legs of the mirror to be in sync . . .

[################################ . . . ] 62% 6356/
    10240 regions
[##############################################
    #######] 100% 10240/10240 regions
Both legs of the mirror device are in sync now . . .
#dmsetup status mirror-mpathy-mpathz
0 10485760 mirror 2 253:30 253:10 10240/10240 1 AA 1
    core
Migration of data from source device to target device is
    complete. New IOs to source device are cloned to both
    source and target. Now the migration can be
    finalized . . .
Suspending source dm device . . . IOs to the source device
    will be suspended till a resume is done . . .

#dmsetup suspend—nolockfs mpathy
#dmsetup info mpathy
Name: mpathy
State: SUSPENDED
Read Ahead: 8192
Tables present: LIVE
Open count: 0
Event number: 0
Major, minor: 253, 11
Number of targets: 1
UUID: mpath-36000d3 10049c6c000000000000000a08
Checking again to make sure both the legs of the mirror
    are in sync . . .

[##############################################
    #######] 100% 10240/10240 regions
Both legs of the mirror device are in sync now . . .
#dmsetup status mirror-mpathy-mpathz
0 10485760 mirror 2 253:30 253:10 10240/10240 1 AA 1
    core
Suspending the target dm device . . .

#dmsetup--nolockfs suspend mpathz
#dmsetup info mpathz
Name: mpathz
State: SUSPENDED
Read Ahead: 8192
Tables present: LIVE
```

Open count: 1
Event number: 0
Major, minor: 253, 10
Number of targets: 1
UUID: mpath-36000d310049c6c000000000000000a06
Updating multipathing bindings file . . .
========================
Current bindings:
mpathy 36000d310049c6c000000000000000a08
mpathz 36000d310049c6c000000000000000a06
sed-i "s/mpathy 36000d310049c6c000000000000000a08/mpathy 36000d310049c6c000000000000000a06/"/etc/multipath/bindings
sed-i "s/mpathz 36000d310049c6c000000000000000a06/mpathz 36000d310049c6c000000000000000a08/"/etc/multipath/bindings
Updated bindings:
mpathy 36000d310049c6c000000000000000a06
mpathz 36000d3 10049c6c000000000000000a08
Updating the device tables . . .
========================
Current tables:
dmsetup table mpathy
0 10485760 multipath 0 0 1 1 round-robin 0 1 1 252:0 1
dmsetup table mpathz
0 10485760 multipath 0 1 alua 1 1 service-time 0 4 2 67:192 1 1 65:0 1 1 133:64 1 1 128:144 1 1
dmsetup reload mpathy--table 0 10485760 multipath 1 queue_if_no_path 1 alua 1 1 service-time 0 4 2 67:192 1 1 65:0 1 1 133:64 1 1 128:144 1 1
dmsetup reload mpathz--table 0 10485760 multipath 1 queue_if_no_path 1 alua 1 1 service-time 0 4 2 67:208 1 1 65:16 1 1 133:80 1 1 128:160 1 1
Updated tables: the changes are not reflected till the devices are resumed . . .
dmsetup table mpathy
0 10485760 multipath 0 0 1 1 round-robin 0 1 1 252:0 1
dmsetup table mpathz
0 10485760 multipath 0 1 alua 1 1 service-time 0 4 2 67:192 1 1 65:0 1 1 133:64 1 1 128:144 1 1
Removing the mirror device . . .
========================
dmsetup remove mirror-mpathy-mpathz
Removing the proxy device . . .
========================
dmsetup remove mpathy-proxy
Resuming the source (previously target) dm device . . .
========================
dmsetup resume mpathy
dmsetup info mpathy
Name: mpathy
State: ACTIVE
Read Ahead: 8192
Tables present: LIVE
Open count: 0
Event number: 0
Major, minor: 253, 11
Number of targets: 1
UUID: mpath-36000d310049c6c000000000000000a08
dmsetup table mpathy
0 10485760 multipath 1 queue_if_no_path 1 alua 1 1 service-time 0 4 2 67:192 1 1 65:0 1 1 133:64 1 1 128:144 1 1
Resuming the target (previously source) dm device . . .
========================
dmsetup resume mpathz
dmsetup info mpathz
Name: mpathz
State: ACTIVE
Read Ahead: 8192
Tables present: LIVE
Open count: 0
Event number: 0
Major, minor: 253, 10
Number of targets: 1
UUID: mpath-36000d3 10049c6c000000000000000a06
dmsetup table mpathz
0 10485760 multipath 1 queue_if_no_path 1 alua 1 1 service-time 0 4 2 67:208 1 1 65:16 1 1 133:80 1 1 128:160 1 1
Unloading the request splitter driver . . . This will remove the request-splitter block device as well . . .
========================
========================
rmmod emcpreqsplitter
lsmod|grep emcpreqsplitter
ls-l/dev/request-splitter
ls: cannot access '/dev/request-splitter': No such file or directory
Configuration after migration . . .
========================
multipath-ll mpathy
May 25 08:28:38| 67:192: path wwid appears to have changed. Using map wwid.
May 25 08:28:38| 65:0: path wwid appears to have changed. Using map wwid.
May 25 08:28:38| 133:64: path wwid appears to have changed. Using map wwid.
May 25 08:28:38| 128:144: path wwid appears to have changed. Using map wwid.
mpathy (36000d310049c6c000000000000000a08) dm-11 COMPELNT,Compellent Vol size=5.0G features='1 queue_if_no_path' hwhandler='1 alua' wp=rw
'-+-policy='service-time 0' prio=50 status-active
|-4:0:10:1 sdbi 67:192 active ready running
|-4:0:3:1 sdq 65:0 active ready running
|-5:0:19:1 sdhe 133:64 active ready running
'5:0:3:1 sdeh 128:144 active ready running
multipath-ll mpathz
May 25 08:28:39| 67:208: path wwid appears to have changed. Using map wwid.
May 25 08:28:39| 65:16: path wwid appears to have changed. Using map wwid.
May 25 08:28:39| 133:80: path wwid appears to have changed. Using map wwid.
May 25 08:28:39| 128:160: path wwid appears to have changed. Using map wwid.
mpathz (36000d310049c6c000000000000000a06) dm-10 COMPELNT,Compellent Vol size=5.0G features='1 queue_if_no_path' hwhandler='1 alua' wp=rw
'-+-policy='service-time 0' prio=50 status=active
|-4:0:10:2 sdbj 67:208 active ready running
|-4:0:3:2 sdr 65:16 active ready running
|-5:0:19:2 sdhf 133:80 active ready running
'-5:0:3:2 sdei 128:160 active ready running
dmsetup table mpathy
0 10485760 multipath 1 queue_if_no_path 1 alua 1 1 service-time 0 4 2 67:192 1 1 65:0 1 1 133:64 1 1 128:144 1 1

```
#dmsetup table mpathz
0 10485760 multipath 1 queue_if_no_path 1 alua 1 1
    service-time 0 4 2 67:208 1 1 65:16 1 1 133:80 1 1
    128:160 1 1
Migration is complete.
[root@abc123~]#
```

What is claimed is:

1. An apparatus comprising:
at least one processing device comprising a processor coupled to a memory;
the at least one processing device being configured:
to control delivery of input-output operations from a host device to a storage system over selected ones of a plurality of paths through a network; and
to migrate a first logical storage device associated with a first multi-path device to a second logical storage device associated with a second multi-path device;
wherein migrating the first logical storage device to the second logical storage device comprises:
suspending the first multi-path device;
creating a proxy device for the first multi-path device;
implementing a mirror device to provide a mirroring arrangement between the proxy device and the second multi-path device;
inserting a request splitter between the first multi-path device and the mirror device;
redirecting output of the first multi-path device to the request splitter; and
resuming the first multi-path device.

2. The apparatus of claim 1 wherein the at least one processing device comprises at least a portion of the host device.

3. The apparatus of claim 1 wherein said at least one processing device comprises a multi-path input-output driver of the host device, with the multi-path input-output driver of the host device being configured to perform at least a portion of the migrating of the first logical storage device to the second logical storage device.

4. The apparatus of claim 3 wherein the multi-path input-output driver of the host device comprises a device mapper multi-path input-output driver operating in a Linux native multi-pathing environment.

5. The apparatus of claim 1 wherein the first and second logical storage devices are in a same storage array of the storage system.

6. The apparatus of claim 1 wherein the first and second logical storage devices are in respective distinct first and second storage arrays of the storage system.

7. The apparatus of claim 1 wherein migrating the first logical storage device to the second logical storage device further comprises, responsive to synchronization of the proxy device and the second multi-path device via the mirroring arrangement between the proxy device and the second multi-path device:
suspending the first multi-path device;
removing the request splitter, the mirror device and the proxy device;
redirecting output of the first multi-path device to the second logical storage device; and
resuming the first multi-path device.

8. The apparatus of claim 7 wherein migrating the first logical storage device to the second logical storage device further comprises:
suspending the second multi-path device;
redirecting output of the second multi-path device to the first logical storage device; and
resuming the second multi-path device.

9. The apparatus of claim 1 wherein redirecting output of the first multi-path device to the request splitter comprises:
removing one or more existing paths from a data structure associated with the first multi-path device; and
inserting into the data structure at least one path to the request splitter.

10. The apparatus of claim 9 wherein the inserted path to the request splitter is the only remaining path for the first multi-path device in the data structure.

11. The apparatus of claim 7 wherein redirecting output of the first multi-path device to the second logical storage device comprises:
removing one or more existing paths from a data structure associated with the first multi-path device; and
inserting into the data structure at least one path previously utilized by the second multi-path device to access the second logical storage device.

12. The apparatus of claim 8 wherein redirecting output of the second multi-path device to the first logical storage device comprises:
removing one or more existing paths from a data structure associated with the second multi-path device; and
inserting into the data structure at least one path previously utilized by the first multi-path device to access the first logical storage device.

13. The apparatus of claim 1 wherein the first and second multi-path devices comprise respective request-based devices in a Linux native multi-pathing environment.

14. The apparatus of claim 1 wherein the mirror device comprises a block input-output based device in a Linux native multi-pathing environment.

15. A computer program product comprising a non-transitory processor-readable storage medium having stored therein program code of one or more software programs, wherein the program code, when executed by at least one processing device comprising a processor coupled to a memory, causes the at least one processing device:
to control delivery of input-output operations from a host device to a storage system over selected ones of a plurality of paths through a network; and
to migrate a first logical storage device associated with a first multi-path device to a second logical storage device associated with a second multi-path device;
wherein migrating the first logical storage device to the second logical storage device comprises:
suspending the first multi-path device;
creating a proxy device for the first multi-path device;
implementing a mirror device to provide a mirroring arrangement between the proxy device and the second multi-path device;
inserting a request splitter between the first multi-path device and the mirror device;
redirecting output of the first multi-path device to the request splitter; and
resuming the first multi-path device.

16. The computer program product of claim 15 wherein migrating the first logical storage device to the second logical storage device further comprises, responsive to synchronization of the proxy device and the second multi-path device via the mirroring arrangement between the proxy device and the second multi-path device:
suspending the first multi-path device;
removing the request splitter, the mirror device and the proxy device;
redirecting output of the first multi-path device to the second logical storage device; and
resuming the first multi-path device.

17. The computer program product of claim 15 wherein redirecting output of the first multi-path device to the request splitter comprises:
  removing one or more existing paths from a data structure associated with the first multi-path device; and
  inserting into the data structure at least one path to the request splitter.

18. A method comprising:
  controlling delivery of input-output operations from a host device to a storage system over selected ones of a plurality of paths through a network; and
  migrating a first logical storage device associated with a first multi-path device to a second logical storage device associated with a second multi-path device;
  wherein migrating the first logical storage device to the second logical storage device comprises:
  suspending the first multi-path device;
  creating a proxy device for the first multi-path device;
  implementing a mirror device to provide a mirroring arrangement between the proxy device and the second multi-path device;
  inserting a request splitter between the first multi-path device and the mirror device;
  redirecting output of the first multi-path device to the request splitter; and
  resuming the first multi-path device.

19. The method of claim 18 wherein migrating the first logical storage device to the second logical storage device further comprises, responsive to synchronization of the proxy device and the second multi-path device via the mirroring arrangement between the proxy device and the second multi-path device:
  suspending the first multi-path device;
  removing the request splitter, the mirror device and the proxy device;
  redirecting output of the first multi-path device to the second logical storage device; and
  resuming the first multi-path device.

20. The method of claim 18 wherein redirecting output of the first multi-path device to the request splitter comprises:
  removing one or more existing paths from a data structure associated with the first multi-path device; and
  inserting into the data structure at least one path to the request splitter.

\* \* \* \* \*